US008279466B2

(12) United States Patent
Tokunaga

(10) Patent No.: US 8,279,466 B2
(45) Date of Patent: Oct. 2, 2012

(54) DOCUMENT PROCESSING METHOD AND DOCUMENT PROCESSING APPARATUS

(75) Inventor: Momoe Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1294 days.

(21) Appl. No.: 11/759,852

(22) Filed: Jun. 7, 2007

(65) Prior Publication Data

US 2008/0007770 A1    Jan. 10, 2008

(30) Foreign Application Priority Data

Jun. 14, 2006 (JP) ................................ 2006-165364

(51) Int. Cl.
*G06F 3/12* (2006.01)
(52) U.S. Cl. ....... 358/1.15; 358/1.14; 705/1.1; 705/301; 715/765; 726/1; 726/2
(58) Field of Classification Search ................. 358/1.15, 358/1.1, 1.13, 1.14; 703/22; 705/1.1, 301; 709/208; 715/745, 764; 726/1, 2, 4
See application file for complete search history.

(56) References Cited

U.S. PATENT DOCUMENTS

| | | | |
|---|---|---|---|
| 6,185,683 B1 * | 2/2001 | Ginter et al. | 713/176 |
| 6,539,404 B1 * | 3/2003 | Ouchi | 715/205 |
| 7,574,745 B2 | 8/2009 | Yoneyama | |
| 2002/0089693 A1 * | 7/2002 | Maruyama | 358/1.15 |
| 2002/0111841 A1 * | 8/2002 | Leymann et al. | 705/7 |
| 2004/0194010 A1 | 9/2004 | Kirihara et al. | |
| 2005/0052664 A1 * | 3/2005 | Ferlitsch | 358/1.6 |
| 2005/0209841 A1 * | 9/2005 | Arning et al. | 703/22 |

FOREIGN PATENT DOCUMENTS

| | | |
|---|---|---|
| EP | 0950971 | 10/1999 |
| JP | 2003281148 | 10/2003 |
| JP | 2004-288053 A | 10/2004 |
| JP | 2004287859 | 10/2004 |
| JP | 2005-228252 A | 8/2005 |
| JP | 2005-258784 A | 9/2005 |
| JP | 2005-259112 A | 9/2005 |
| WO | 2004086163 | 10/2004 |

OTHER PUBLICATIONS

Search report, dated Nov. 8, 2007, in EP 07110052.
Fakas et al., "A peer to peer (P2P) architecture for dynamic workflow management", Elsevier, vol. 46, No. 6, May 1, 2004, pp. 423-431, SP 004494220.
Japanese Office Action dated Oct. 22, 2010 concerning the Japanese Patent Application No. 2006-165364.
Japanese Office Action dated Jul. 11, 2011 concerning Japanese Patent Application No. 2006-165364.

* cited by examiner

*Primary Examiner* — King Poon
*Assistant Examiner* — David S Cammack
(74) *Attorney, Agent, or Firm* — Fitzpatrick, Cella, Harper & Scinto

(57) ABSTRACT

A document processing system comprises a document management apparatus, which executes processing tasks on a document according to a job flow that defines the sequence by which the tasks are to be executed, and a document property management apparatus, which manages properties of the document. The document management apparatus executes processes within the processing tasks on a document that is inputted into the document management apparatus, and performs output processing on the document, according to the job flow that the user has directed for execution. The document management apparatus obtains the properties of the document from the document property management apparatus when the document is inputted, and changes the content of either the process or the output according to the properties in question.

13 Claims, 24 Drawing Sheets

FIG. 4B

```
<JobFlow1>
    <task1>
            <before>start</before>
            <after>task2</after>
            <after>task3</after>
            <property>
                APPLIED WHEN PROPERTY
                INFORMATION IS PRESENT
            </property>
    </task1>
    <task2>
            <before>task1</before>
            <after>task4</after>
    </task2>
    <task3>
            <before>task1</before>
            <after>task4</after>
    </task3>
    <task4>
            <before>task2</before>
            <before>task3</before>
            <after>end</after>
    </task4>
</JobFlow1>
```

FIG. 5

|  | BROWSING | PRINTING | EDITING |
|---|---|---|---|
| ADMINISTRATOR | ○ | ○ | ○ |
| USER A | ○ | × | ○ |
| USER B | × | × | × |

|  | BROWSING | COPYING | PRINTING | EDITING |
|---|---|---|---|---|
| ADMINISTRATOR | ○ | ○ | ○ | ○ |
| USER A | ○ | × | ○ | × |
| USER B | × | × | × | × |

151

F I G. 15

| SECURITY LEVEL | ALTERNATIVE TASK |
|---|---|
| COPY | NOTIFY USER EXECUTING JOB FLOW OF LOCATION WHEREIN FILE IS SAVED |
| PRINT | E-MAIL OR SEND FILE TO USER EXECUTING JOB FLOW |
| ATTACH ELECTRONIC SIGNATURE | NONE |
| ADD TAG | CREATE LOCATION AND INFORMATION TO BE ADDED IN DIFFERENT FILE, PROCESS AS SET WITH DOCUMENT DATA |
| CHANGE DOCUMENT DATA | NONE |

161

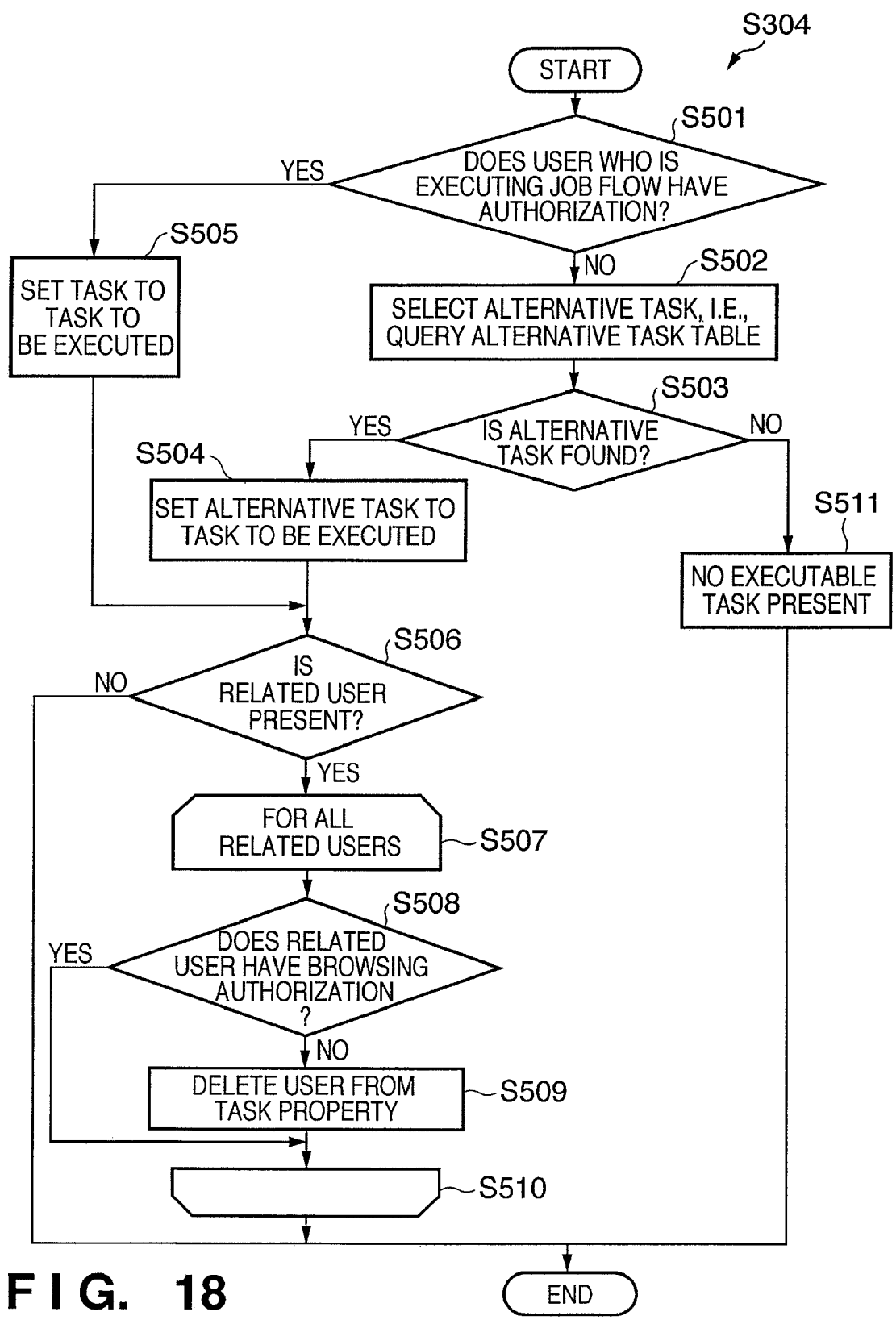
F I G. 18

FIG. 19

|  | BROWSING | COPYING | PRINTING | EDITING |
|---|---|---|---|---|
| ADMINISTRATOR | ○ | ○ | ○ | ○ |
| USER A | ○ | ○ | × | × |
| USER B | ○ | × | × | × |

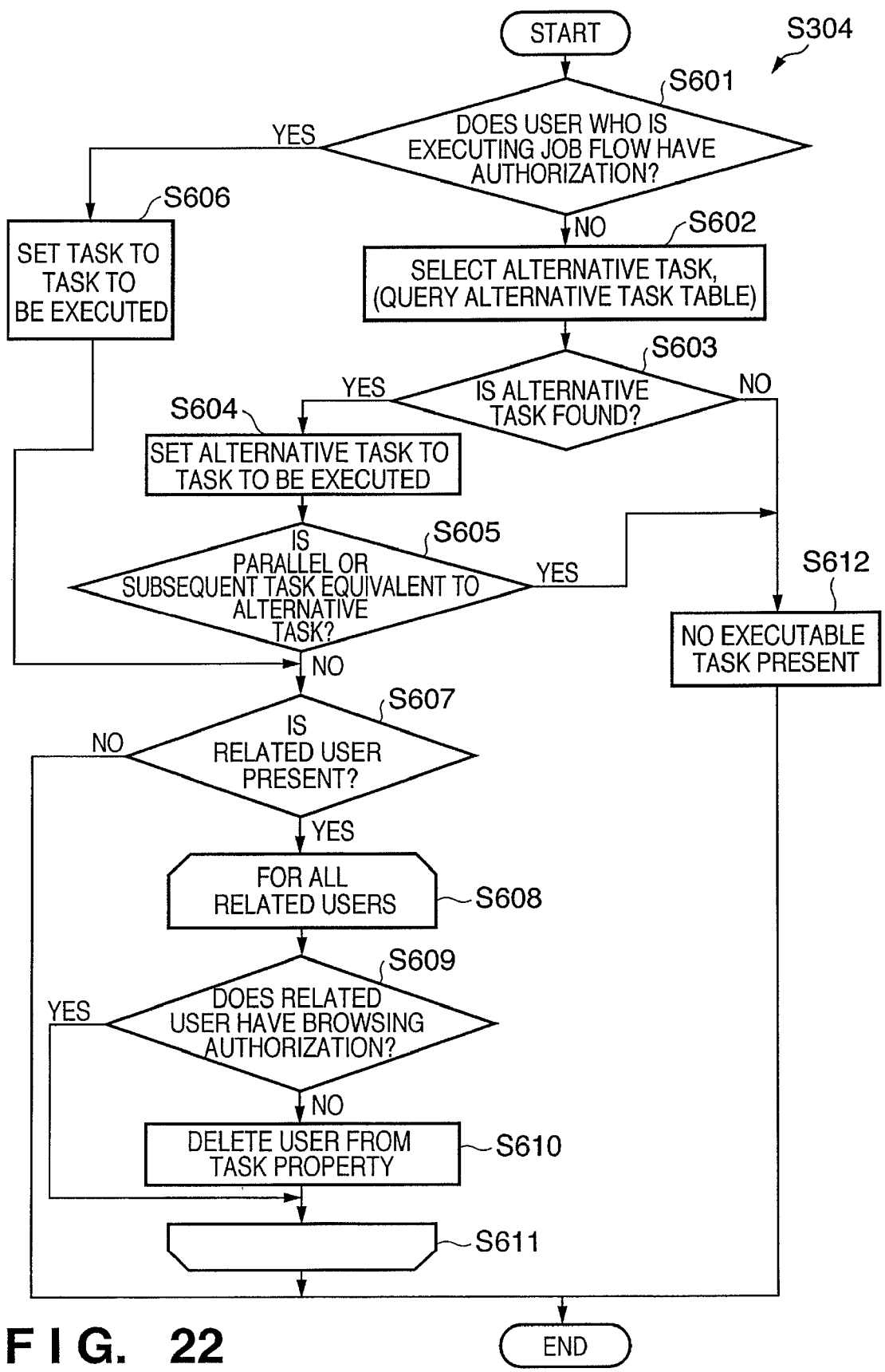
F I G. 22

DOCUMENT PROCESSING METHOD AND DOCUMENT PROCESSING APPARATUS

BACKGROUND OF THE INVENTION

1. Field of the Invention

The invention relates to a document processing apparatus and method that creates and executes a job flow wherein a plurality of processes cooperate.

2. Description of the Related Art

Japanese Patent Laid-Open No. 2004-287859 discloses a service processing apparatus that is capable of combining, either in series or in parallel, such processes as fax transmission, scanning, and printing that are to be carried out on a document data, and setting and executing the processes as a job flow. Using the service processing apparatus that is disclosed in Japanese Patent Laid-Open No. 2004-287859, it is possible to make each respective device that is connected via a network cooperate to execute a plurality of processes that are set to be executed as a job flow.

According to Japanese Patent Laid-Open No. 2004-287859, it is possible to execute a plurality of processes as a single service by making each respective device that is connected via a network cooperate. Issues such as the following arise, however, because no consideration has been given to the handling of data for which security has been applied:

1. The job flow may quit before completion with an error, depending on the security that is applied;
2. It is difficult to create a job flow that takes into consideration the security that is applied to the data that is to be manipulated by the job flow, owing to the fact that the security may vary tremendously depending on the user that instructs the execution of the job flow, i.e., the user executing the job flow; and
3. If the user who receives the data does not possess authorization to access the data, the job flow that is executed will have been to no purpose, even if it is completed successfully.

SUMMARY OF THE INVENTION

The present invention, being devised with the issues in mind, offers an information processing apparatus and method that facilitates executing a job flow as appropriate to such properties as the security level that is set for the data to be processed.

According to one aspect of the present invention, there is provided a document processing system, comprising:

a document management apparatus adapted to execute a processing task according to a job flow that defines an execution order of a plurality of processing tasks; and a document property management apparatus adapted to manage a property of a document, wherein the document management apparatus comprises:
a document input unit;
a job flow processing unit adapted to execute each respective processing task that is included in the job flow that has been directed for execution, according to the job flow, on a document that is inputted via the document input unit;
an output unit connected to the job flow processing unit, and adapted to perform an output processing on the document that is processed by the job flow processing unit, according to the job flow that has been directed for execution;
a document property acquiring unit adapted to acquire a property of the document from the document property management apparatus when the document is inputted; and
a change unit adapted to change either a processing content of the processing task that the job flow processing unit executes, or an output content of the output unit, according to the property of the document that the document property acquiring unit acquires.

Also, according to another aspect of the present invention, there is provided a document processing method by a document processing system comprising: a document management apparatus adapted to executing a processing task according to a job flow that defines an execution order of a plurality of processing tasks; and a document property management apparatus adapted to managing a property of a document, the method comprising:

an input step of inputting a document into the document management apparatus;

a job flow processing step of executing each respective processing task that is included in the job flow that has been directed for execution, according to the job flow, on a document that is inputted via the input step, on the document management apparatus;

an output step of performing an output processing on the document that is processed by the job flow processing step, according to the job flow that has been directed for execution, on the document management apparatus;

a document property acquiring step of acquiring a property of the document from the document property management apparatus when the document is inputted, on the document management apparatus; and a changing step of changing a processing content of the processing task that the job flow processing step executes, or an output content of the output step, according to the property of the document that the document property acquiring step acquires, on the document management apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4B depicts a definition information, in XML, that corresponds to the job flow example depicted in FIG. 4A.

FIG. 5 depicts an example of a security level being set on a per user basis for a document data A that is managed on the policy management server 12.

FIG. 14 depicts an example of a security level being set on a per user basis for the document data A that is managed on the policy management server 12, according to a third embodiment.

FIG. 15 displays an alternative task table that contains alternative tasks that may be executed when a task cannot be executed because of the document data's security level.

FIG. 18 is a flowchart describing a process of determining the alternative task and the property, according to the third embodiment.

FIG. 19 depicts an example of a security level being set on a per user basis for a document B that is managed on the policy management server 12, according to the third embodiment.

FIG. 22 is a flowchart describing a process of determining the alternative task and the property, according to the fourth embodiment.

DESCRIPTION OF THE EMBODIMENTS

Preferred embodiments of the present invention will now be described in detail in accordance with the accompanying drawings.

[First Embodiment]

Following is a description of a system configuration and an application configuration according to the embodiment.

<System Configuration>

Figure 1:
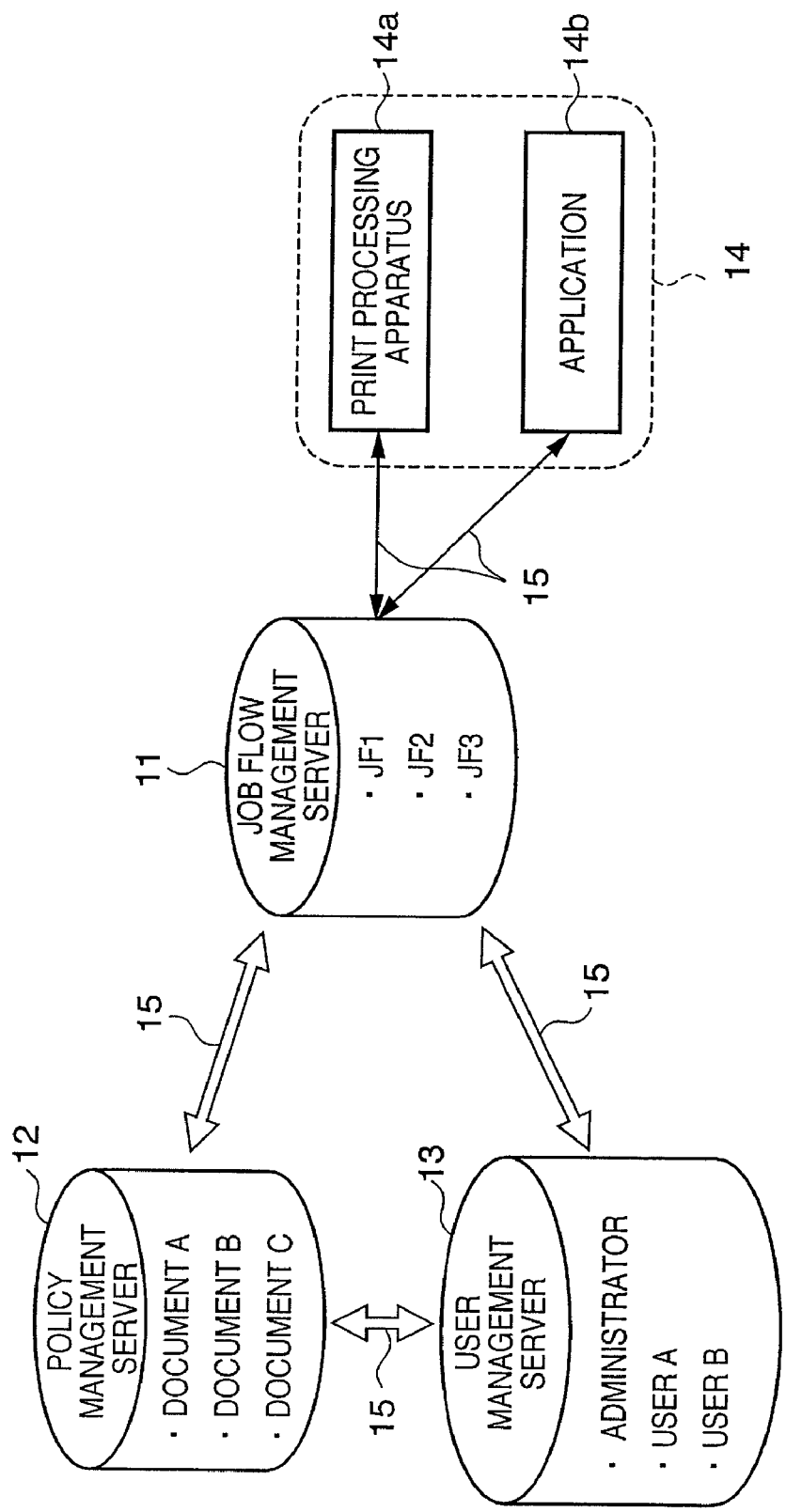
FIG. 1 depicts an overall configuration of a task cooperation processing system according to the embodiment.

FIG. 1 depicts an overall configuration of a task cooperation processing system according to the embodiment. The task cooperation processing system according to the embodiment entails a print processing apparatus 14a cooperatively executing a variety of tasks that are offered by the print processing apparatus 14a or an application 14b. A task according to the embodiment denotes a unit of executable processing on the document data. For example, a task of the print processing apparatus 14a would signify a process on the document data such as a copy process, a scan process, a fax transmission process, a process of saving the document data to a hard drive within the print processing apparatus, or an e-mail transmission process. That the task is not limited to the foregoing goes without saying. The task cooperation processing system according to the embodiment is capable of cooperating with a plurality of applications 14b, which are in turn capable of offering a variety of tasks, in addition to the print processing apparatus 14a, which offers the foregoing tasks. The print processing apparatus 14a and the application 14b are collectively defined as a task processing apparatus 14, according to the embodiment. A job flow management server 11 executes a task cooperation process according to a job flow definition, in cooperation with a plurality of task processing apparatuses 14.

As depicted in FIG. 1, the task cooperation processing system according to the embodiment is connected to the job flow management server 11, a policy management server 12, a user management server 13, and the task processing apparatus 14, via a dedicated network 15 for each apparatus. The job flow management server 11 manages the task processing apparatus 14, such as the print processing apparatus 14a and the application 14b, as well as a plurality of job flows (JF1, JF2, or JF3). The policy management server 12 manages the document data and the security information for the document data. The user management server 13 manages information about a user who executes a job flow, as well as for a user who accesses the document data.

While there is no limit on the number of the respective apparatuses, the task cooperation processing system according to the embodiment entails a single job flow management server 11, a single policy management server 12, a single user management server 13, and a single task processing apparatus 14 being connected. The description according to the job flow that is being executed is predicated on the handling of the document data that is being managed by the policy management server 12.

<Operating Flow>

Figure 2:
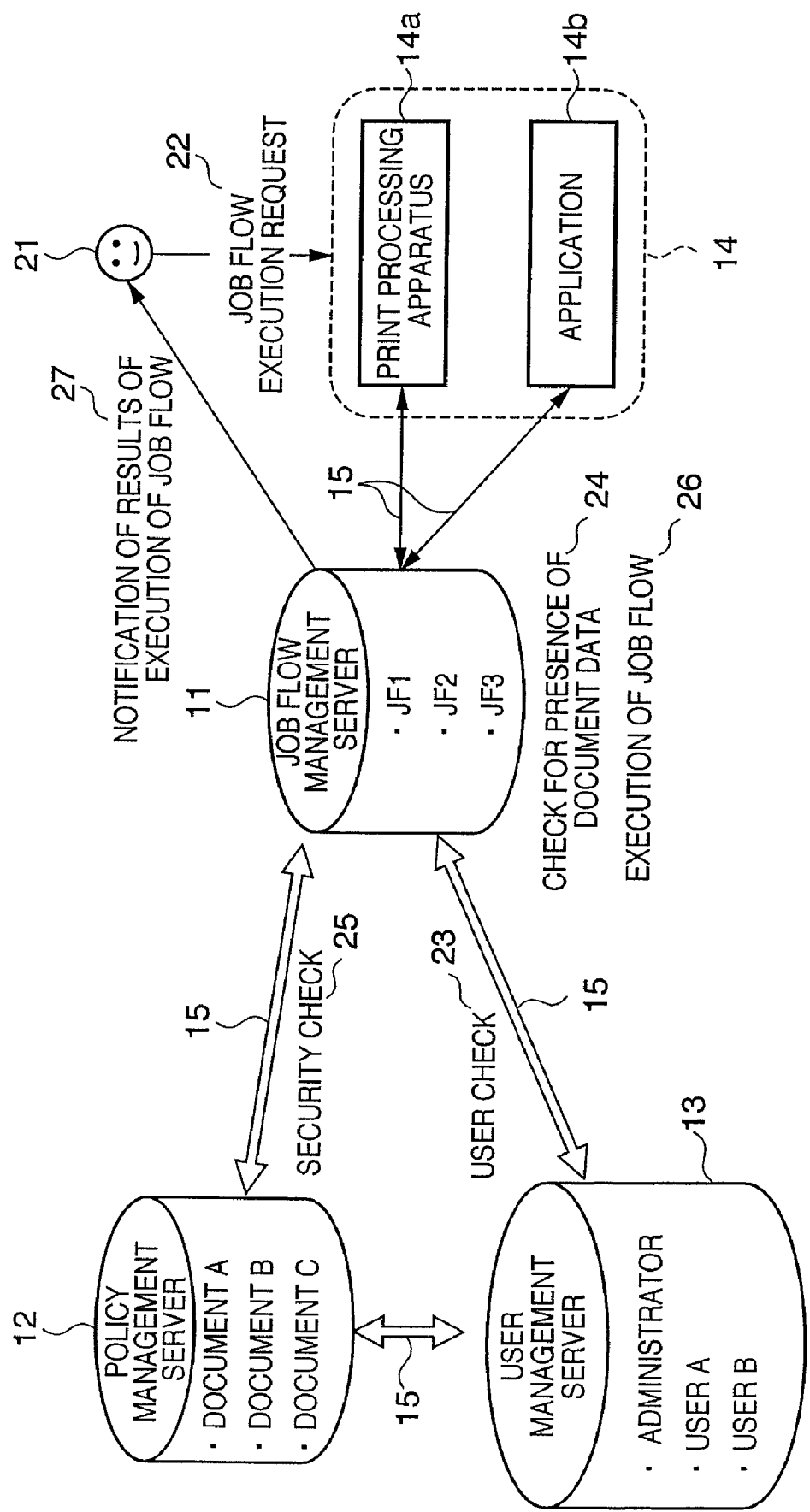
FIG. 2 is a flowchart that depicts an operation by the task cooperation processing system when a job flow is executed that handles a document data that is managed on a policy management server 12.

FIG. 2 is a flowchart that depicts an operating flow of the task cooperation processing system when a job flow is executed that handles a document data that is managed on the policy management server 12.

When a user 21 requests a job flow execution from the task processing apparatus 14 (step 22), the task processing apparatus 14 requests that the job flow management server 11 execute the job flow. Upon receipt of the job flow execution request from the task processing apparatus 14, the job flow management server 11 performs a user check, which queries the user management server 13 for information on the user 21 who is executing the job flow (step 23). When the user check is passed, the job flow management server 11 executes a check for the presence of the document data, which checks whether or not the document data is being used in a task within the job flow that is being executed (step 24). If a task is present that uses the document data that is being managed on the policy management server 12, the job flow management server 11 performs a security check (step 25), by querying the policy management server 12 for the security information of the document data that is being handled within the job flow. The policy management server 12 manages the security level for the document data on a per user basis. Accordingly, the job flow management server 11 is capable of checking whether or not the user 21 who is executing the job flow possesses authorization for the document data, by examining the security information on the policy management server 12. Following the security check in step 25, the job flow management server 11 executes the job flow by causing the task processing apparatus 14 to execute the task, according to the security level on the document data (step 26). Once the job flow is executed, a record is left, such as a log of job flow execution results, and notifies the user 21 of the execution results (step 27). It is possible to perform the recording or the notification of the execution results, and the recipient of the notification of the results is not solely limited to the user 21 who is executing the job flow.

<Task Definition Information>

Figure 3:
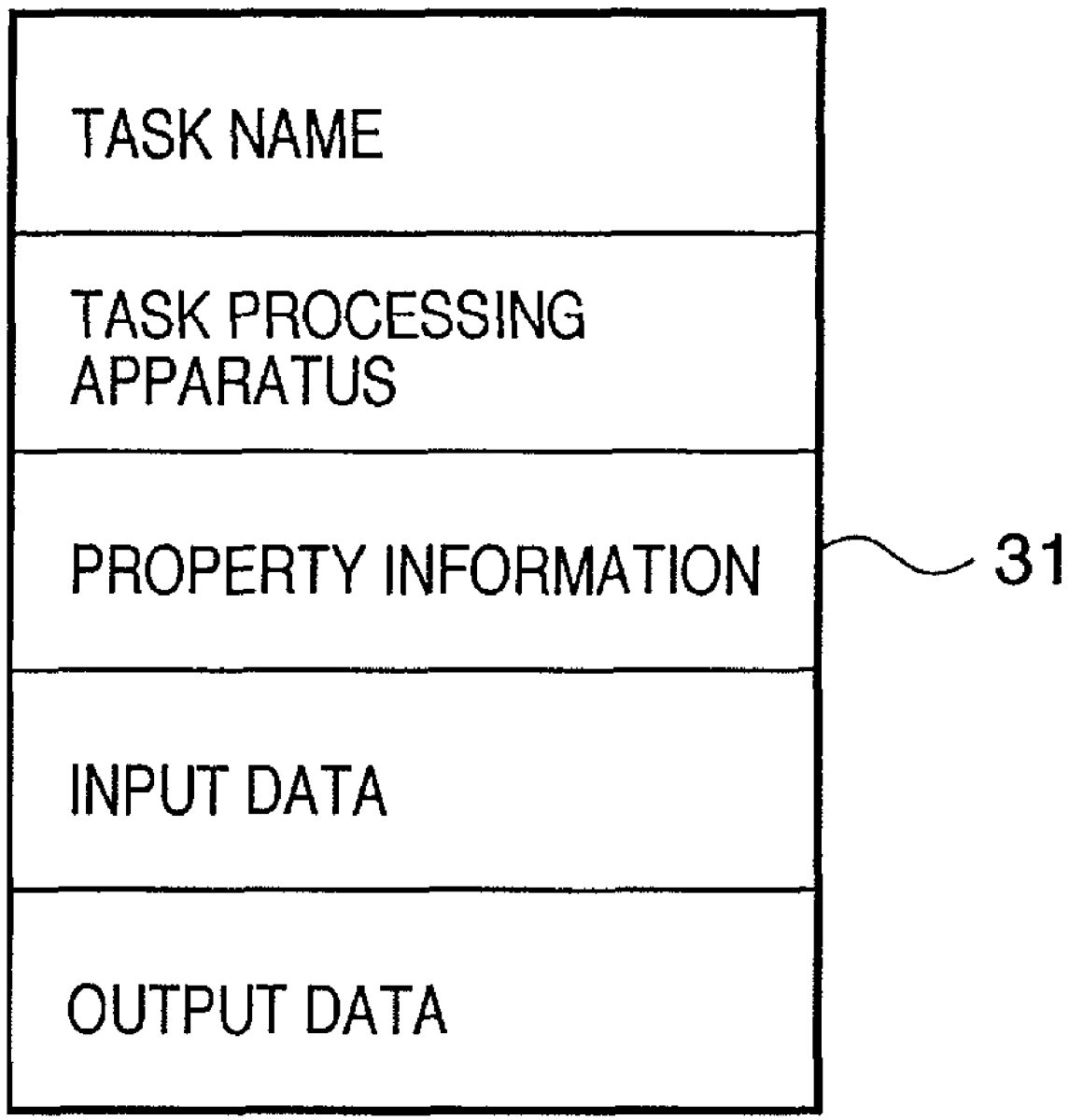
FIG. 3 depicts an example of a data configuration of a task definition information according to the embodiment.

FIG. 3 depicts an example of a data configuration of a task definition information according to the embodiment. A task definition information 31 stores the following information on a task: a task name, the task processing apparatus that executes the task, a property information that is necessary for the execution of the task, an input data that is necessary for the execution of the task, and an output data that is outputted following the execution of the task. While the task definition information has the protocol denoted in FIG. 3 according to the embodiment, the descriptive protocol of the task definition information is not limited thereto.

<Job Flow Definition Information>

Figure 4A:
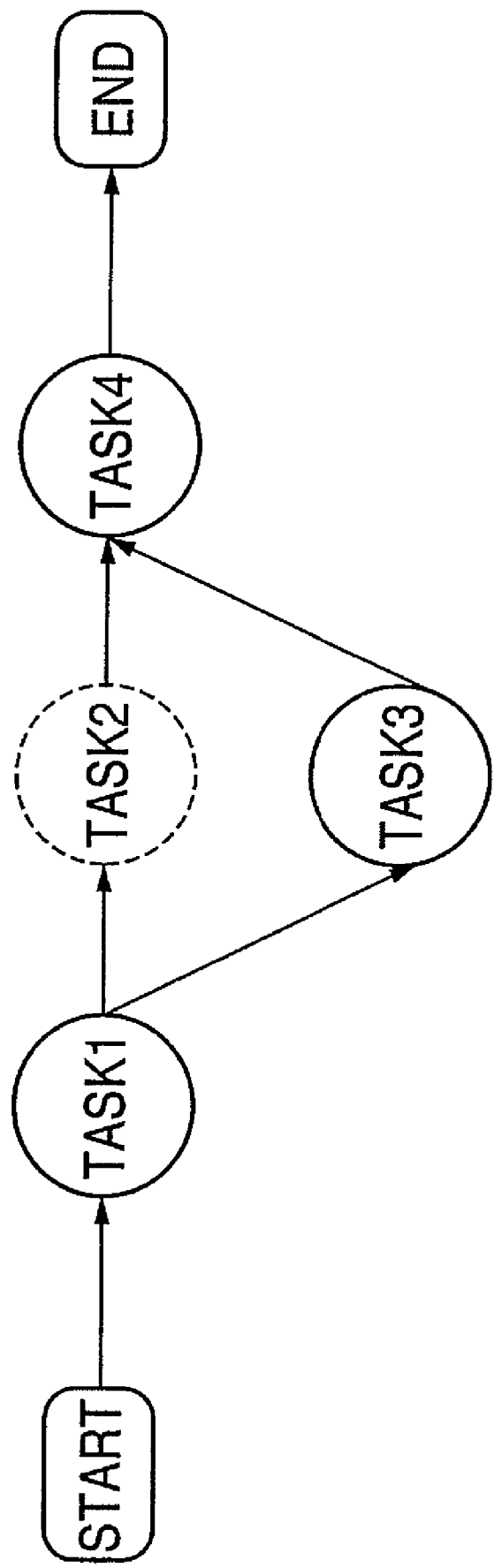
FIG. 4A depicts an example of a job flow for describing a job flow definition information according to the embodiment.

Following is a description of a job flow definition information according to the embodiment, with reference to FIGS. 4A and 4B.

FIG. 4A depicts an example of a job flow for describing a job flow definition information according to the embodiment. The example job flow in FIG. 4A executes a task 1, processes a task 2 and a task 3 in parallel, and executes a task 4, whereupon the job flow terminates. FIG. 4B depicts a definition information, in XML, that corresponds to the job flow example depicted in FIG. 4A. According to the embodiment, an XML task tag is labeled to correspond to each task, with a task execution sequence defined by the task name that is executed prior to the given task and the task name that is executed following the given task labeled appropriately. When information relating to the property of the task is defined within the task definition information, the information is described within the property tag. The job flow definition information is completed by describing all of the tasks that are defined within the job flow, using the task tag to define the tasks. The description of the job flow definition information is not limited to XML, provided that the contextual relationship between the tasks is clear and unequivocal.

<Job Flow Execution Process with Consideration for Security>

FIG. 5 depicts an example of a security level setting 51 on a per user basis for a document data A, i.e., a document A, that is managed on the policy management server 12, according to the embodiment. According to the security level setting 51, an administrator possesses browsing, printing, and editing authorization for the document A. While the user A possesses browsing and editing authorization for the document A, the user A does not possess printing authorization. A user B does not possess authorization to execute browsing, printing, or editing for the document A. It is also permissible to set a security level that would disable printing for the document A, without limitation by user. The security level depicted in FIG. 5 is a segment of the property information of the document A, which describes a process restriction on a per user basis relating to the document A.

While the example of the security level depicted in FIG. 5 describes an example of the process restriction on a per user basis relating to the document A, it would also be permissible to organize users into groups, and restrict processes on a per group basis. It is further presumed that it would be permissible to include process restrictions that apply to all users.

Figure 6:
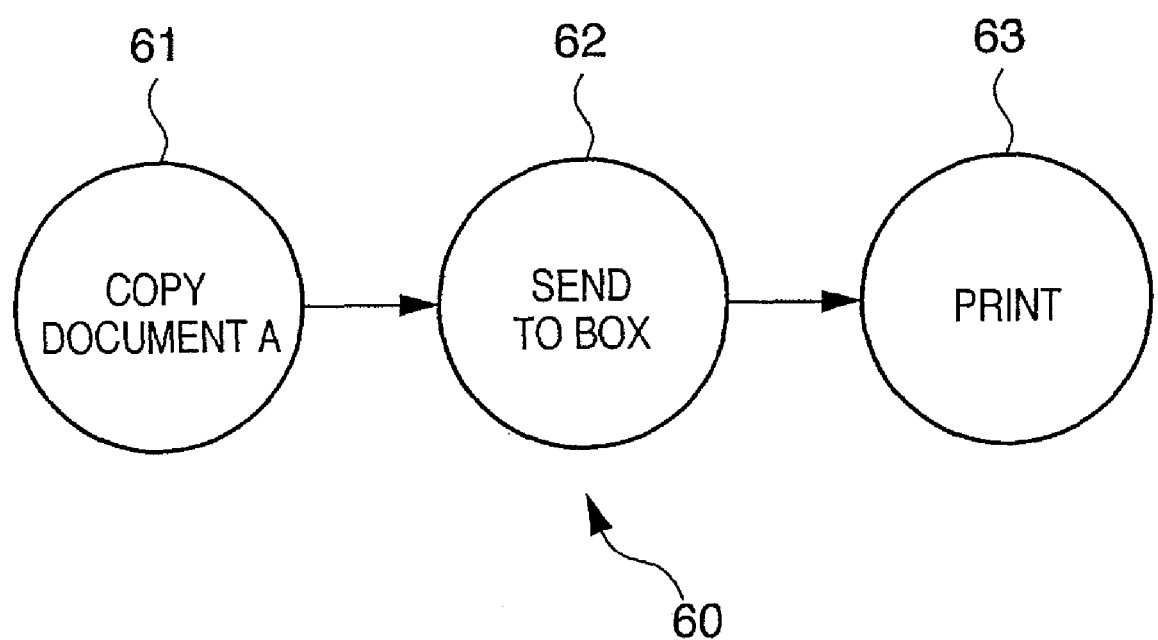
FIG. 6 depicts a description of a job flow definition that is handled according to the embodiment.

Following is a description of a job flow execution process, such as is depicted in FIG. 6, treating a circumstance wherein the authorization of the administrator, the user A, and the user B is set for the browsing process, the printing process, and the editing process for the document A such as is depicted in FIG. 5. FIG. 6 depicts a description of a job flow definition that is handled according to the embodiment. A job flow 60 in FIG. 6 is configured of a task 61, which copies the document A, a task 62, which sends the document A to a box of the print processing apparatus, i.e., sends a data of the document A to a storage apparatus, and a task 63, which prints the document A.

Figure 7:
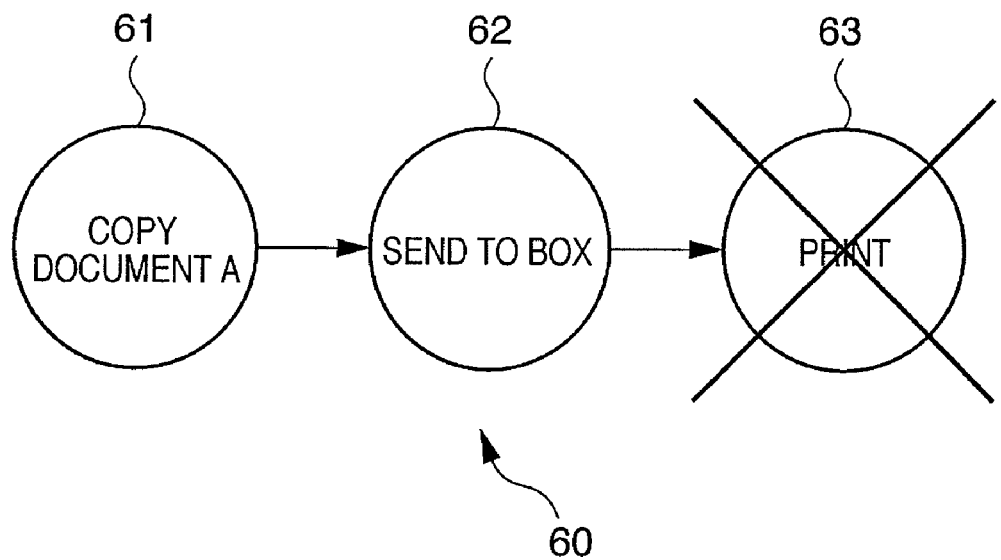
FIG. 7 depicts an embodiment of each respective task when a user A executes the job flow 60 that is depicted in FIG. 6.

FIG. 7 depicts an embodiment of each respective task when the user A executes the job flow 60 that is depicted in FIG. 6. When the user A commences execution of the job flow 60, the job flow management server 11 queries the user management server 13 for the user information of the user A (the user check in step 23). If the user check is able to obtain user authentication, the job flow management server 11 processes the tasks within the job flow, in sequence.

Given that the respective tasks of the job flow 60 use the document A, the policy management server 12 is queried for the authorization of the user A for the document A, prior to the execution of each respective task (the security check in step 25). Given that the security level is set such as is depicted in FIG. 5, it will be evident to the job flow management server 11 that the user A possesses authorization other than printing authorization. Accordingly, the task 61, to copy the document A, and the task 62, to transmit the document A to the Box, are executed as per normal. Given, however, that the user A does not possess authorization to print the document A, the job flow 60 terminates without executing the task 63, to print the document A.

Figure 8:
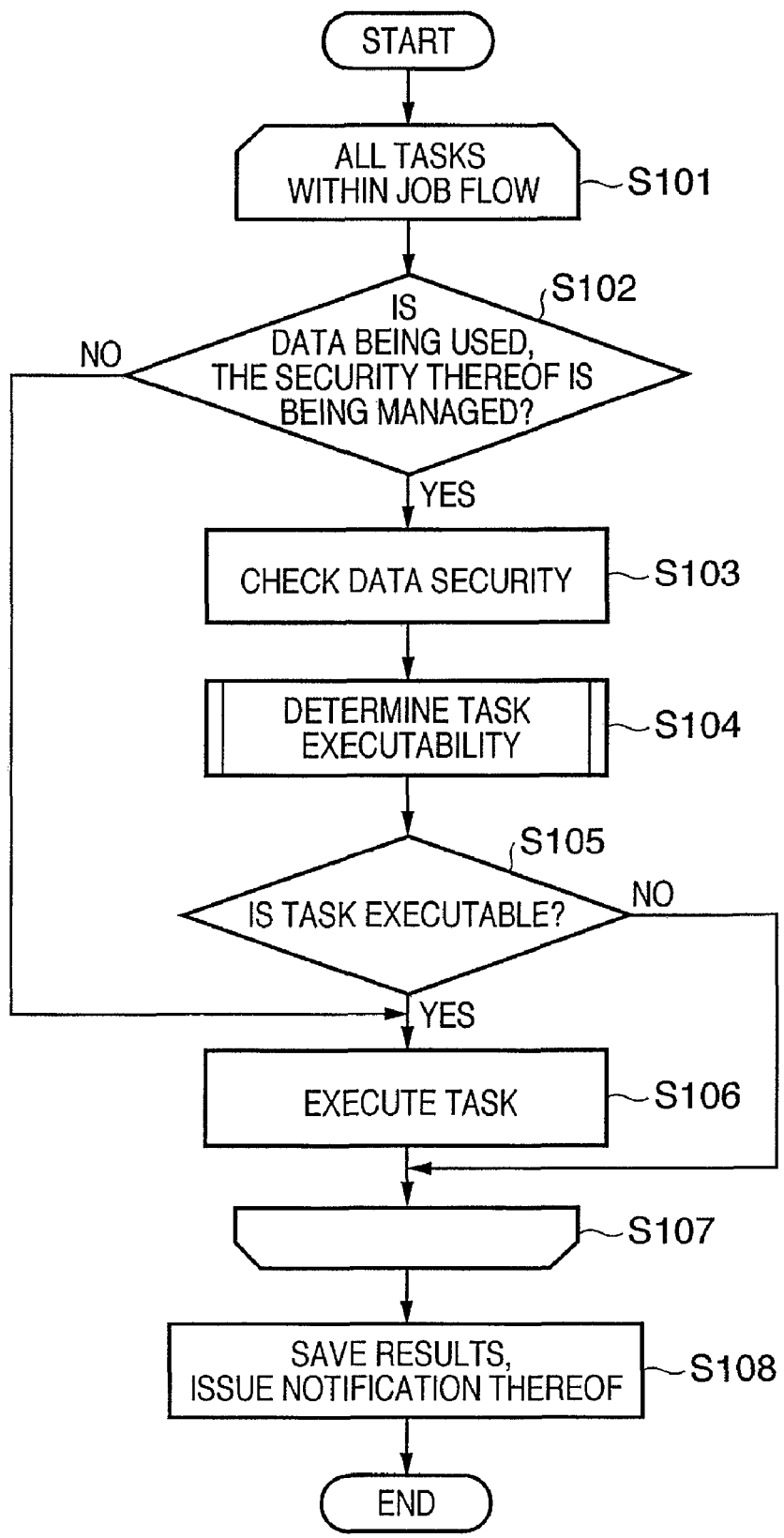
FIG. 8 is a flowchart that describes using a job flow management server 11 for a job flow execution process, according to the embodiment.
Figure 9:
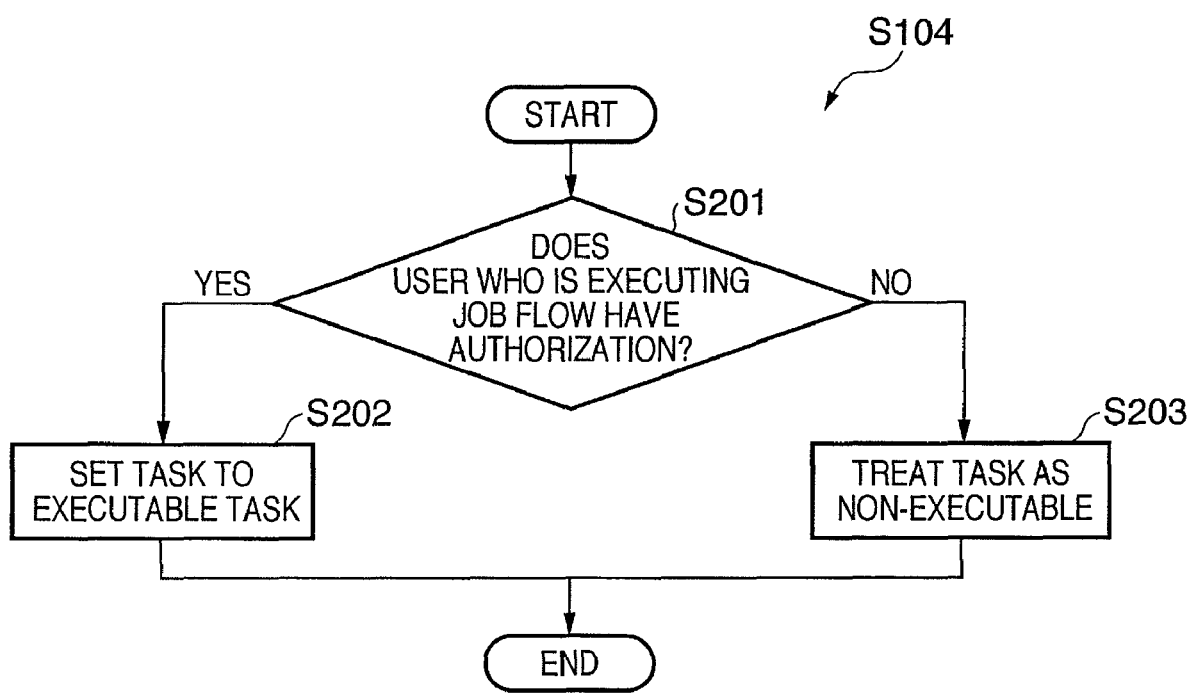
FIG. 9 is a flowchart that depicts a process of execution task determination, performed by the job flow management server (FIG. 8, step S104), according to the embodiment.

FIGS. 8 and 9 are flowcharts that describe using the job flow management server 11 for a job flow execution process, according to the embodiment. The process depicted in FIG. 8 is launched following obtainment of user authentication in the user check (step 23).

When the process commences, the process steps S102 through S106 are repeated for all of the tasks within the job flow that is being executed (steps S101 and S107).

The job flow management server 11 checks whether or not the document data that is managed on the policy management server 12 is being used (step S102). When the task does not use the document data that is managed on the policy management server 12, the task is executed promptly (step S106). The tasks 61 through 63 are applied to the document A that is managed on the policy management server 12, and thus, the process proceeds to step S103.

When the task uses the document data that is managed on the policy management server 12, the job flow management server 11 performs the security check (step S103), by querying the policy management server 12 regarding the security of the document data. Based on the security level for the user who is executing the job flow, the job flow management server 11 determines whether or not to execute the task (step S104). If, in step S104, a determination is made to execute the task, the process proceeds from step S105 to step S106, and the job flow management server 11 executes the task. If a determination is made not to execute the task, the execution of the task is prevented, by skipping step S106. When the processing of steps S101 through S107 is completed for all tasks within the job flow, the results of job flow that is executed is saved and a notification issued (step S108), and the process terminates.

FIG. 9 is a flowchart that depicts a process of execution task determination by the job flow management server 11 (FIG. 8, step S104), according to the embodiment. The process is executed if a task that is present within the job flow being executed is applied to the document data that is managed on the policy management server 12.

The job flow management server 11 checks whether or not the user who is executing the job flow possesses authorization for the process that the task is attempting to execute on the document data, based on the security information that is obtained from the policy management server 12 (step S201). If it is determined that the user does possess authorization, the job flow management server 11 sets the task for execution (step S202), and the process terminates. If, on the other hand, it is determined that the executing user does not possess authorization, the task cannot be properly executed, and thus, the job flow management server 11 sets the task not to be executed (step S203), whereupon the process terminates.

For example, a security level has not been set for the document A concerning the processing of the tasks 61 and 62, i.e., copying and transmitting to the Box. Thus, the user is determined to possess authorization for the processes, and the tasks are set to be executed. Consequently, the tasks 61 and 62 are executed within the execution of the job flow 60. According to the security level setting 51, in FIG. 5, however, the user A who is executing the job flow does not possess authorization for the process of the task 63, i.e., printing. Consequently, the task 63 is set not to be executed in step S203, and the task 63 is skipped, i.e., execution is prevented, in step S105.

According to the first embodiment, a determination is made in accordance with the security level that is set for the person who is executing the job flow as to whether or not the tasks that are contained within the job flow are to be executed. Thus, the job flow is executed as appropriate to the corresponding security.

[Second Embodiment]

According to the first embodiment, an example was described wherein the job flow changes dynamically in response to the user who is executing the job flow and the security level that is set for the user. According to a second embodiment, an example will be described wherein the job flow changes dynamically when a user is present who is related to each respective task other than the user who is executing the job flow. The configuration for such as the task cooperation processing system according to the second embodiment is similar to that according to the first embodiment. It is presumed that the security level depicted in FIG. 5 is set for a document B on the policy management server 12.

Figure 10:
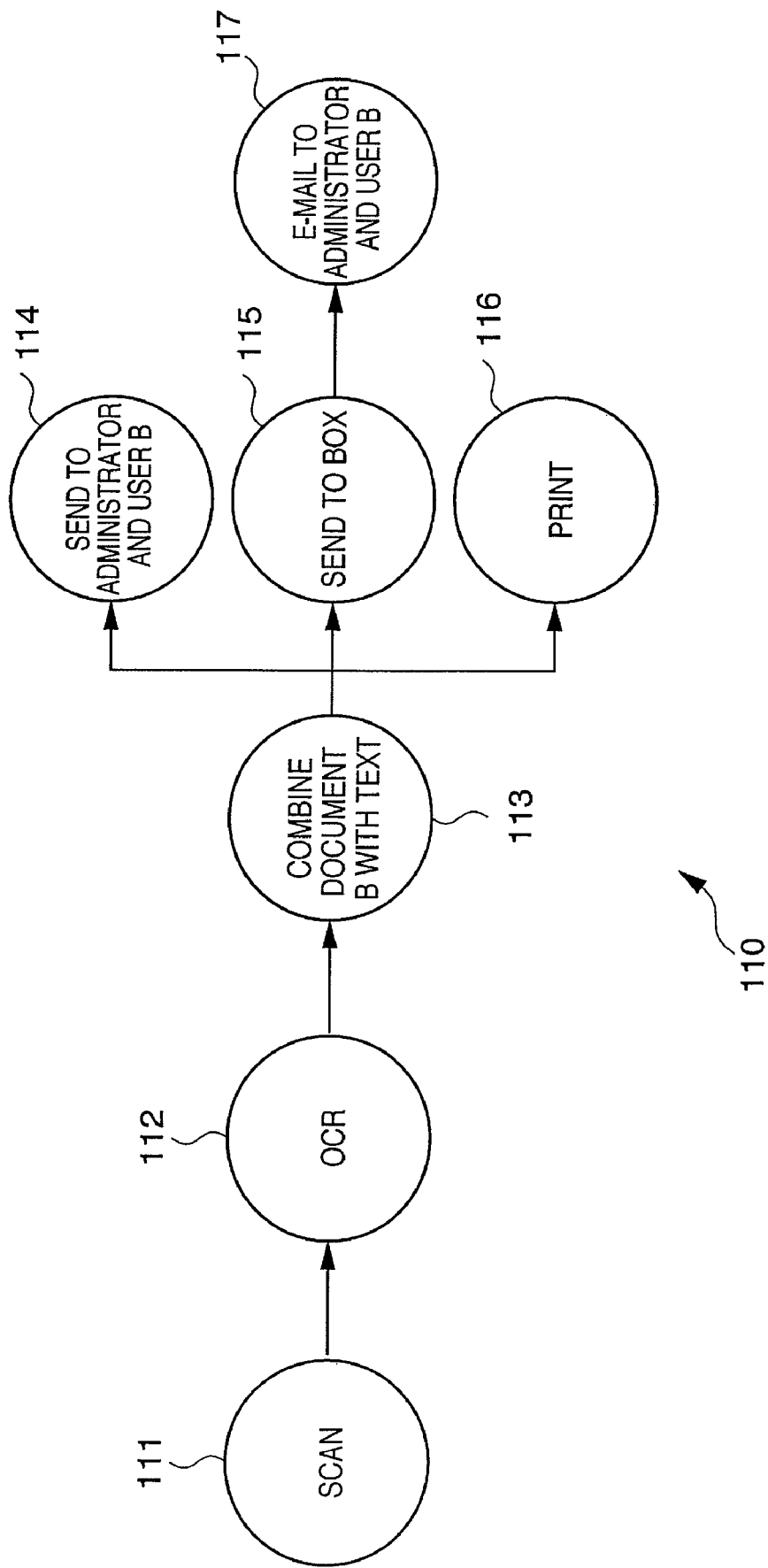
FIG. 10 depicts a description of a job flow definition that is depicted as an example according to a second embodiment.

FIG. 10 depicts a description of a job flow definition that is depicted as an example according to the second embodiment. The job flow 110 is configured of the following seven tasks:

A task 111, that scans the document data;

A task 112, that carries out OCR processing on the document data that is scanned in the task 111, and performs a text extraction;

A task 113, that combines the text data that is extracted in the task 112 with the document data B that is managed on the policy management server 12;

A task 114, that sends the document data B that was combined and created in the task 113 to the administrator and a user B;

A task 115, that sends the document data B that was combined and created in the task 113 to the storage apparatus, i.e., the Box;

A task 116, that uses the print processing apparatus 14a to print the document data B that was combined and created in the task 113; and A task 117, that sends an e-mail notification to the administrator and the user B that the document data B that was combined and created in the task 113 has been sent to the Box.

The job flow 110 is processed through cooperation between the job flow management server 11 and the task processing apparatus 14. Hence, the task 115 (sending to the Box), means a transmission of data to a storage region within the task processing apparatus 14, i.e., within the print processing apparatus 14a, that is referred to as the Box. It would also be permissible to send the data to a storage region, i.e., a folder, on the user's PC. When sending the data to the folder on the user's PC, a protocol is used such as e-mail, a send to a folder wherein the files are shared, using a Server Message Block (SMB), protocol, or a put command that is part of the File Transfer Protocol (FTP).

Figure 11:
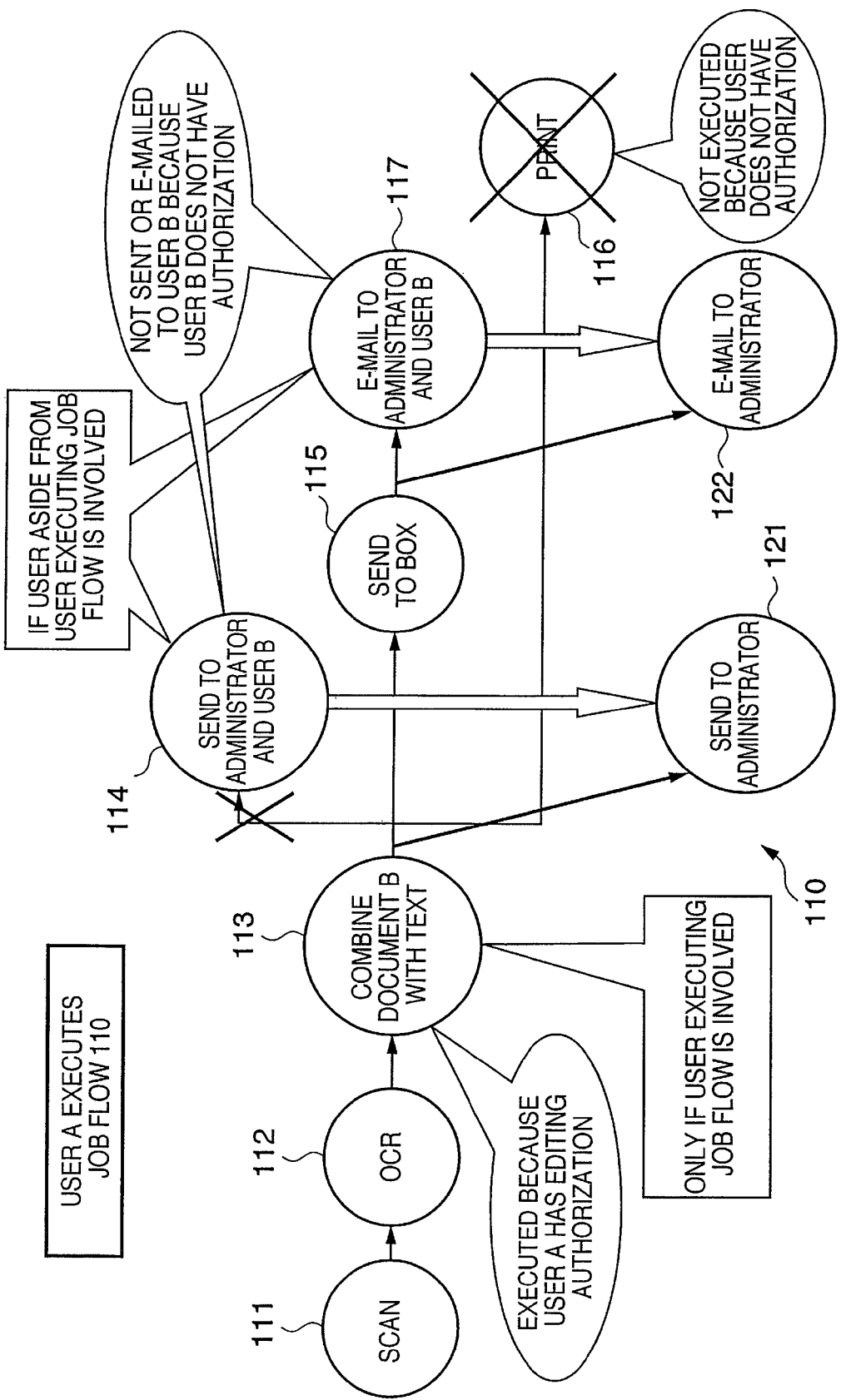
FIG. 11 depicts an execution status of each respective task when the user A executes a job flow 110 that is depicted in FIG. 10.

FIG. 11 depicts an execution status of each respective task when the user A executes the job flow 110 that is depicted in FIG. 10. When the user A commences execution of the job flow 110, the job flow management server 11 queries the user management server 13 for the user information of the user A (the user check in FIG. 2 (step 23)). If the user check is able to obtain user authentication, the job flow management server 11 processes the tasks within the job flow, in sequence.

Given that the task 111, i.e., scanning, and the task 112, i.e., OCR, do not handle the document data that is managed on the policy management server 12, the processes are executed without performing the security check. The task 113 performs a combination of the document B and the text, wherein the document B is the document data that is managed on the policy management server 12. Accordingly, when the task 113 is executed, the job flow management server 11 queries the policy management server 12 for the security information of the user A for the document data. As depicted in FIG. 5, the task 113 is determined to be executable, because the user A possesses editing authorization for the document B, and thus, the task 113 is executed.

The task 114 relates both to the user who is executing the job flow, such as each respective task that is depicted according to the first embodiment, as well as to the user other than the user who is executing the job flow. Hence, if the task relates to the user other than the user who is executing the job flow, and handles the document data that is managed on the policy management server 12, the policy management server 12 is queried for the security information on all users that are connected with the task, including the user who is executing the job flow. According to the embodiment, the security level for the document B is as depicted in FIG. 5, and there is no constraint for the send process that is executed by the task 114. Thus, the task 114 is executable thereupon. While the administrator who relates to the task 114 possesses all authorization, the user B possesses no authorization whatsoever. In such a circumstance, executing the task 114 as written has no point, because, even if the document B that has been edited in the task 113 is sent to the user B, the user B does not possess browsing authorization for the document B. According to the embodiment, the job flow management server 11 changes the property of the task 114, changing it into a task 121, which sends the document B that has been edited in the task 113 only to the administrator. The modified task 121 is then executed.

The task 115, which sends the document data B, which was combined with the text in the task 113, to the Box, relates only to the user A who is executing the job flow, and has no constraint relating to the process. Thus, it is executed as written. The task 116 performs a print of the document data that includes the document B. As depicted in FIG. 5, however, the user A does not possess authorization to print the document B, and thus, the task 116 is not executed, through a process similar to that according to the first embodiment. The task 117 handles the document data that includes the document B, and is related to the administrator and the user B, in addition to the user A who is executing the job flow. Thus, all users are checked for security pertaining to the document B.

According to the embodiment, the administrator who relates to the task 114 possesses all authorization, whereas the user B possesses no authorization at all, as depicted in FIG. 5. Consequently, the property of the task 117 is changed, similar to the task 114, to send the e-mail, i.e., the notification that the document B has been sent to the Box, only to the administrator, and execution is performed as a task 122.

Figure 12:
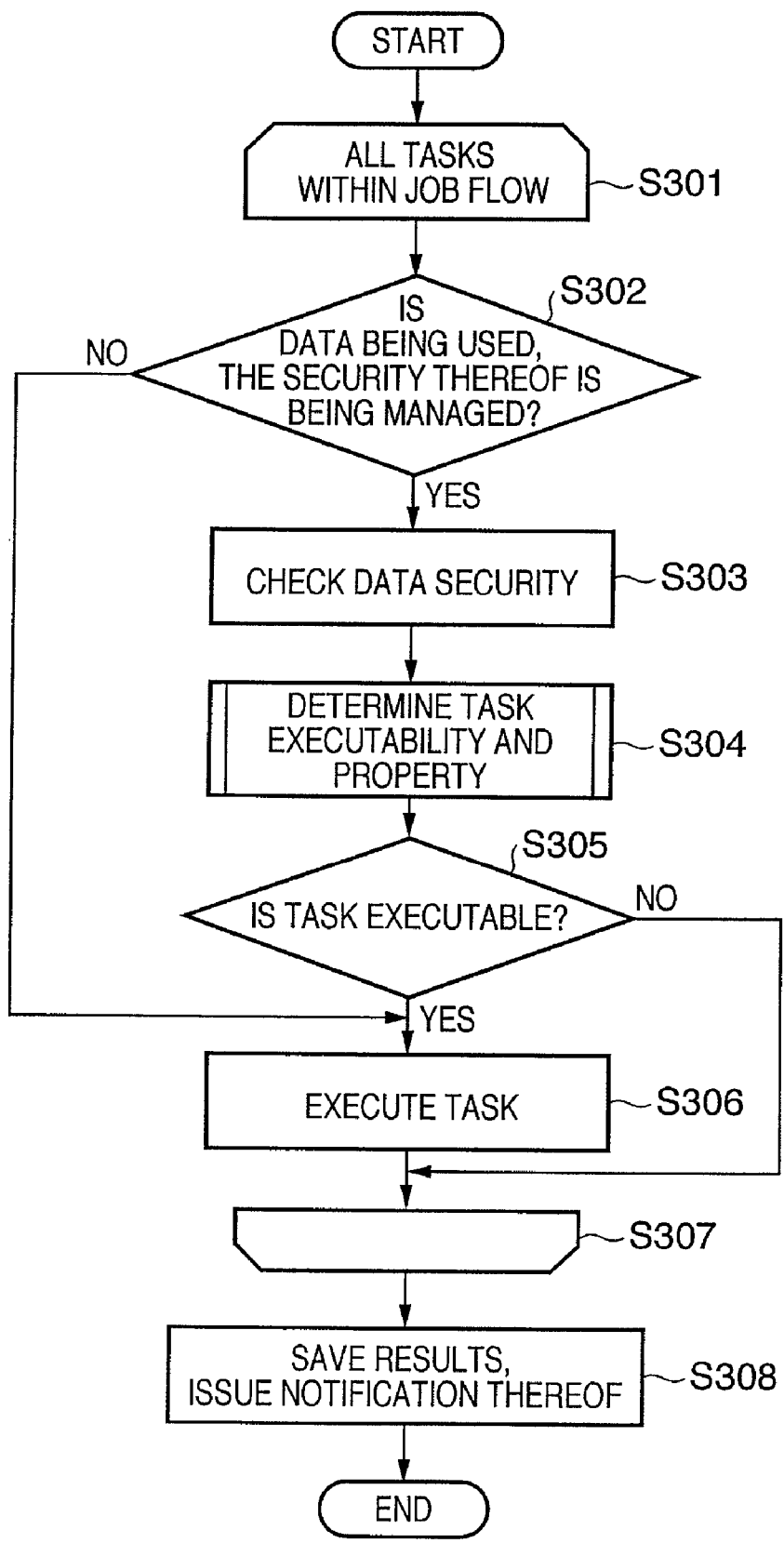
FIG. 12 is a flowchart that describes a process of the job flow management server 11 executing a job flow, according to the second embodiment.
Figure 13:
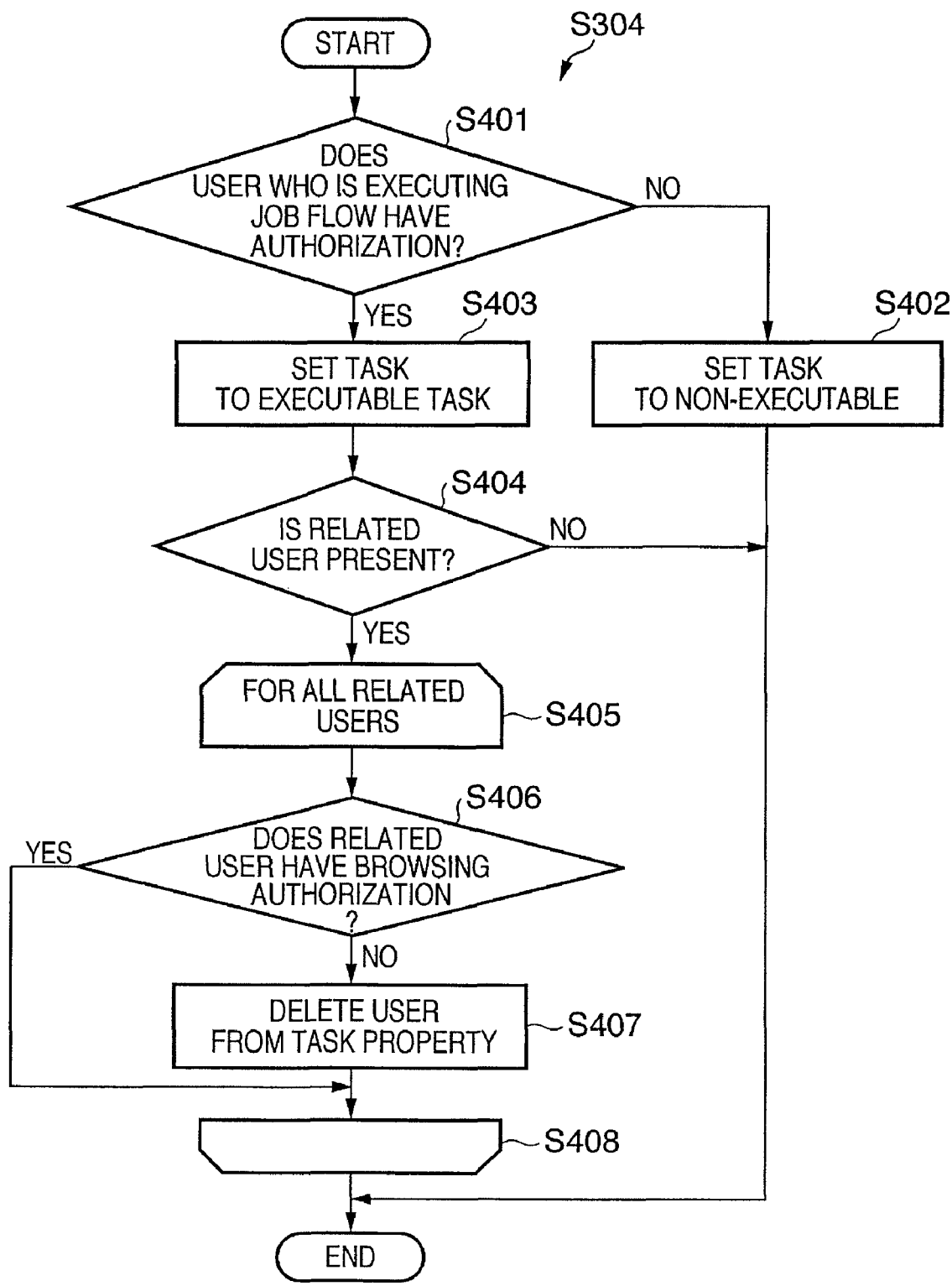
FIG. 13 is a flowchart that depicts a process of the job flow management server 11 determining an execution task and a property (FIG. 12, step S304), according to the second embodiment.

FIG. 12 and FIG. 13 are flowcharts that describe a process of an affiliation of the job flow management server 11 and the task processing apparatus 14 executing a job flow, according to the second embodiment.

When the job flow process commences, steps S301 through S307 are executed for all tasks within the job flow that is being executed. The job flow management server 11 checks whether or not the document data that is managed on the policy management server 12 is being used (step S302). When the task does not use the document data that is managed on the policy management server 12, the process proceeds to step S306, wherein the job flow management server 11 executes the task.

When the task uses the document data that is managed on the policy management server 12, the job flow management server 11 performs the security check (step S303), by querying the policy management server 12 regarding the security of the document data. Based on the security level of the document data for the user who is executing the job flow, as well as for the user who is related to the task, the job flow management server 11 determines the execution of the task, as well as the property of the task (step S304). The process is described in detail in FIG. 13.

Then, the job flow management server 11 checks whether or not the results of the process in step S304 have determined that the task is to be executed (step S305). If the task is to be executed, the task is executed (step S306), according to the property that was determined in step S304. When the process in steps S301 through S307 have been completed for all tasks, the outcome of the executed job flow is saved, and a notification of the outcome issued (step S308), and the process terminates.

FIG. 13 is a flowchart that depicts a process of the job flow management server 11 determining an execution task and a property (FIG. 12, step S304), according to the second embodiment. The process is executed when a task is present within the job flow that is being executed that handles the document data that is managed on the policy management server 12.

Based on the security information for which the policy management server 12 is queried, the job flow management server 11 checks whether or not the user who is executing the job flow possesses authorization to execute the process, vis-à-vis the document data, that is set forth in the task (step S401). If the user who is executing the job flow does not have authorization, the job flow management server 11 sets the task to non-executable (step S402), and the process terminates. If, on the other hand, the user who is executing the job flow does have authorization, the job flow management server 11 sets the task to executable (step S403), and the process proceeds to step S404.

When the task is set to executable, the job flow management server 11 checks whether or not a related user other than the user who is executing the job flow is present for the task (step S404). If no related user is present, the process terminates. If the related user is present, the process in steps S405 through S408 is performed for each respective related user. The job flow management server 11 checks whether or not the related user has browsing authorization (step S406), and deletes the related user from the property of the task if the related user does not have browsing authorization (step S407). If the related user does have browsing authorization, the job flow management server 11 performs a check pertaining to the next related user, without performing the property change. When the process is completed for all related users, the property of the task is determined from the property that is updated in step S407, and the process terminates.

For example, neither the task 111 nor the task 112 have data targeted for processing that is subject to security management. Thus, steps S302 through S306 are skipped, and the process is executed directly. As another example, the task 113 assigns editing authorization to the user A who is executing the job flow, and no related user other than the user who is executing the job flow is present. Thus, process of the task 113 is also executed as written (steps S303, S304, S401, S403, NO in S404, and YES in S305). The tasks 114 and 116 have, as related users, the administrator and the user B, aside from the user who is executing the job flow the user A, and the user B does not have browsing authorization. Thus, the tasks 114 and 116 are executed with the user B deleted from the output destination that is the property information thereof (steps S303, S304, S401, S403, YES in S404, S406, S407, and YES in S305). A lack of browsing authorization prevents all access to the data, while possession of browsing authorization allows access. Accordingly, execution of pointless transmissions is prevented by checking only the browsing authorization of the user to whom the transmission is to be made, according to the embodiment.

According to the second embodiment, the property of the task is determined according to the security level that is set for the user as relates to the execution of the task, in addition to whether or not the task is executable according to the security level of the user who is executing the job flow. Consequently, it is possible to implement efficient job flow execution according to the security.

[Third Embodiment]

According to the first and second embodiments, a description was made of an example of dynamically changing the job flow by changing the executability of the task, as well as the property of the task, according to the security level of the document data. According to a third embodiment, the job flow is dynamically changed to execute an alternative task when the task cannot be executed according to the security level of the document data. Following is a description according to the third embodiment. The configuration for such as the task cooperation processing system according to the third embodiment is similar to that according to the first embodiment.

FIG. 14 depicts an example of a security level being set on a per user basis for the document data A that is managed on the policy management server 12, according to the third embodiment. According to the security level setting 151, the administrator possesses browsing, copying, printing, and editing authorization for the document A. While the user A possesses browsing and printing authorization for the document A, the user A does not possess copying or editing authorization therefor. The user B does not possess authorization to execute any of browsing, copying, printing, or editing authorization for the document A.

FIG. 15 displays an example of a data configuration of an alternative task table that contains alternative tasks that may be executed when a task cannot be executed because of the document data's security level. For example, according to the alternative task table 161, the alternative task that is chosen to be executed when the copy process cannot be executed is the notification to the user who executes the job flow of the location where the file is being saved. The alternative task that is chosen to be executed when the print process cannot be executed is the sending of the data to the user who executes the job flow to modify the process, as well as notification by e-mail. FIG. 15 depicts one example of setting via the alternative task table, which is not limited thereto. The user may set the alternative task at will.

Figure 16:
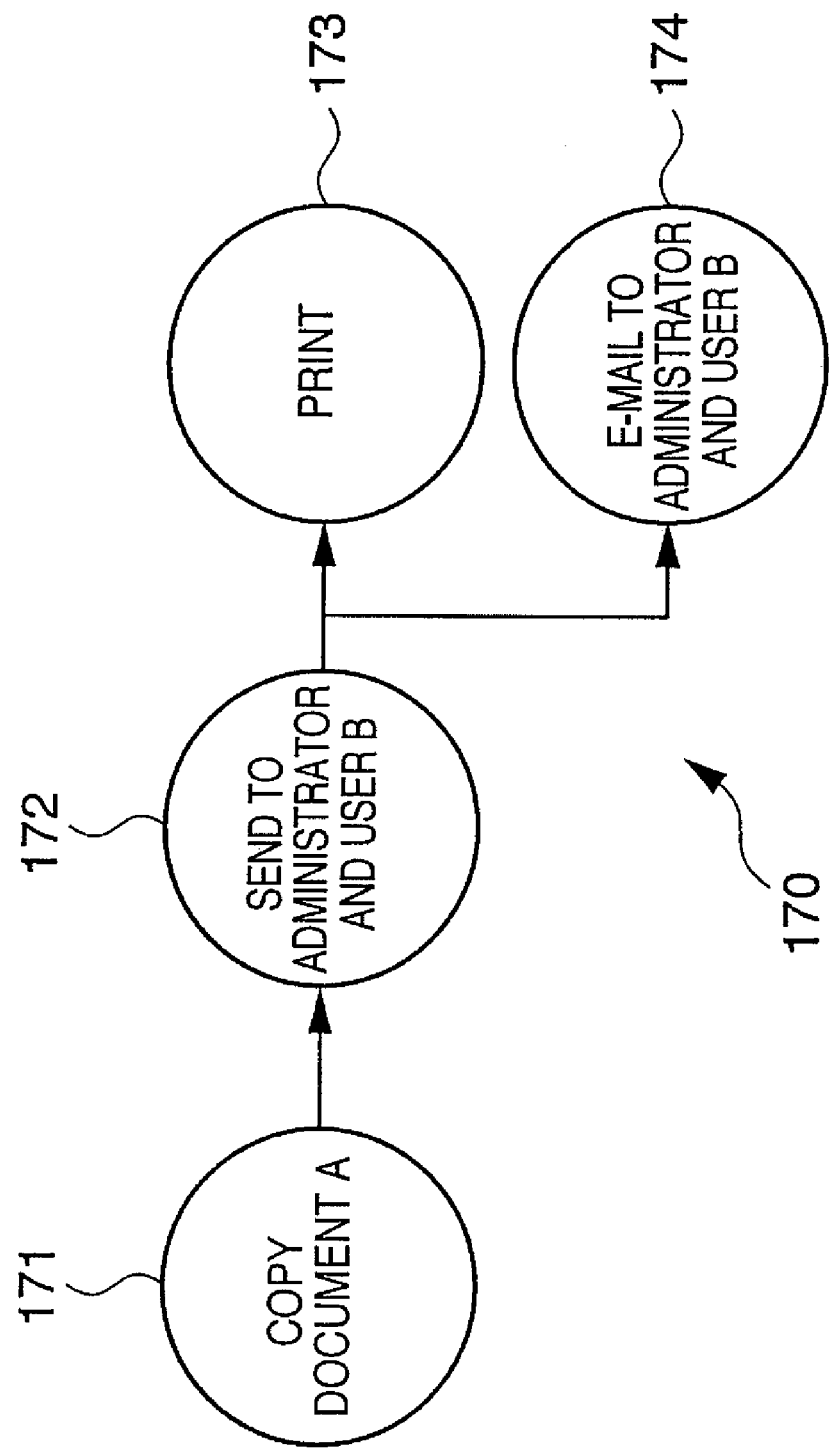
FIG. 16 depicts a description of a job flow definition that is depicted as an example according to the third embodiment.

FIG. 16 depicts a description of a job flow definition that is depicted as an example according to the third embodiment. A job flow 170 is configured of a task 171, that copies the document A, a task 172, that sends the document A to the administrator and the user B, a task 173, that prints the document A, and a task 174, that e-mails the document A to the administrator and the user B.

Figure 17:
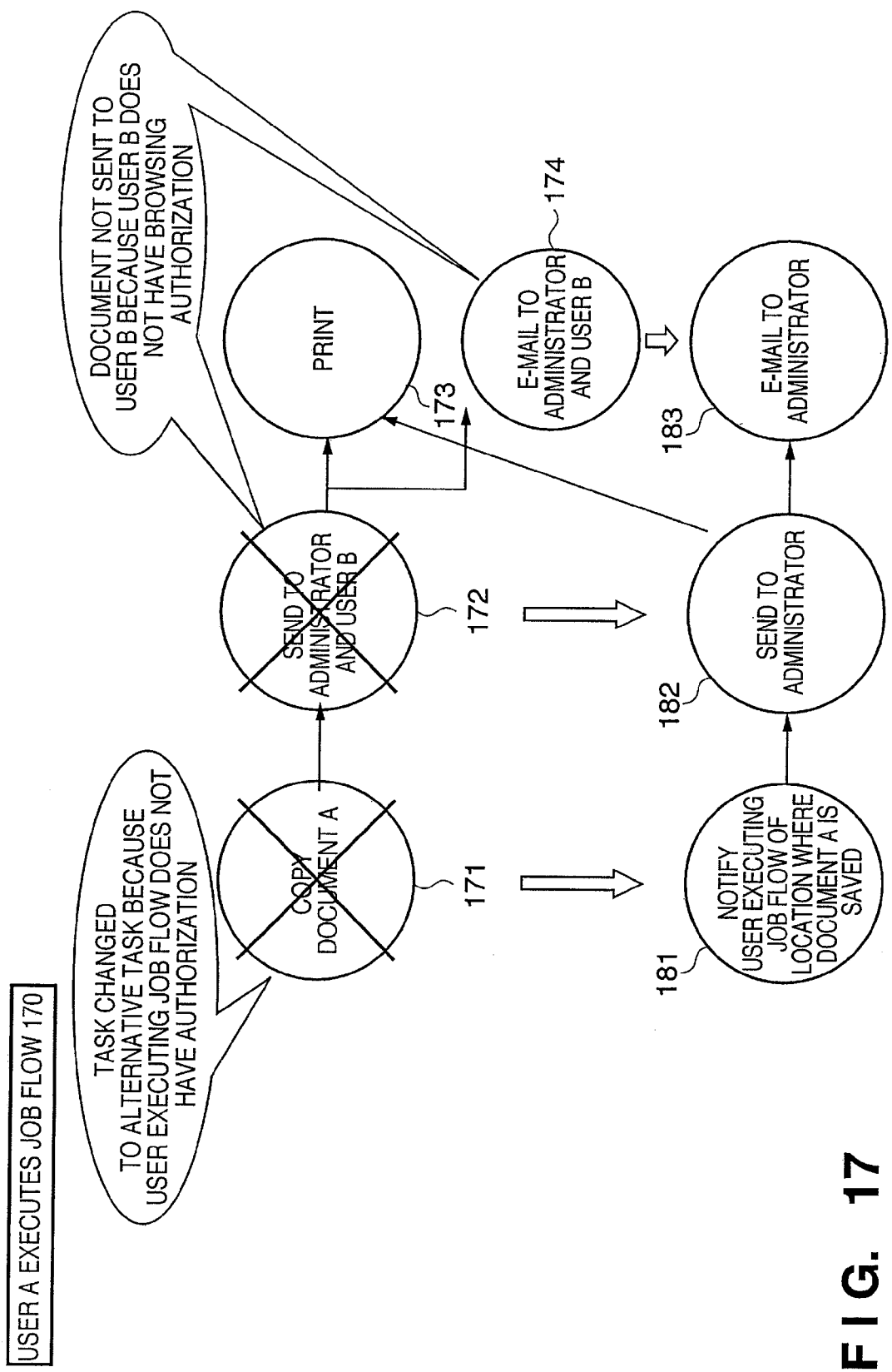
FIG. 17 depicts an execution status of each respective task when the user A executes a job flow 170 that is depicted in FIG. 16.

FIG. 17 depicts an execution status of each respective task when the user A executes the job flow 170 that is depicted in FIG. 16. When the user A directs the commencement of the execution of the job flow 170, the job flow management server 11 queries the user management server 13 for the user information of the user A (the user check in FIG. 2 (step 23)). If the user check is able to obtain the authentication of the user, the job flow management server 11 processes the tasks of the job flow in sequence, and in cooperation with the task processing apparatus 14.

The job flow management server 11 queries the policy management server 12 for the security of the user A vis-à-vis the document data A, because the task 171, which copies the document A, uses the document A that is managed by the policy management server 12. As depicted in FIG. 14, it is apparent that the task 171 cannot be executed, because the user A does not have copying authorization for the document A. According to the third embodiment, the alternative task table 161 that is depicted in FIG. 15 is queried, and a search is performed for an alternative task to the copy task that cannot be executed. According to the embodiment, the task that is defined as the alternative task to the copy task is "notify the person who is executing the job flow of the location where the file is saved." Accordingly, the task 171 is changed to a task 181, wherein a notification is made of the location where the document is saved, and the task 181 is executed instead.

The task 172, sending the document A, is executable because there are no security constraints on the user A thereupon. Given, however, that the recipients, i.e., the administrator and the user B, are also concerned with the task 172, the policy management server 12 is queried for the security of the administrator and the user B vis-à-vis the document A.

As depicted in FIG. 15, the user B has no authorization vis-à-vis the document A. Thus, the job flow management server 11 changes the property of the task 172 to perform the sending of the document A only to the administrator, executing the send as a task 182 (the process as described according to the second embodiment).

The task 173 involves handling the document A that is managed by the policy management server 12, and given that the user A who is executing the job flow has printing authorization, the task is executed as written. Regarding the task 174, the job flow management server 11 changes the property to perform the sending of the document A by e-mail only to the administrator, executing the send as a task 183, similar to the treatment of the task 172.

The process of executing the job flow on the part of the job flow management server 11 is described according to the third embodiment. The process of executing the job flow on the part of the job flow management server 11 is similar to that described according to the second embodiment (FIG. 12). In step S304, however, the setting of the alternative task is performed as required, in addition to the changing of the property. If there is a task that is set to be executed, i.e., the current task, the alternative task, or the task whose properties have been changed, the job flow management server 11 proceeds from step S305 of the process to step S306, and executes the task.

FIG. 18 is a flowchart describing a process of determining the alternative task and the property, according to the third embodiment. The process is executed in FIG. 12, step S304, by the job flow management server 11. The tasks within the job flow that is being executed are executed with regard to the task that is concerned with handling the document A that is managed by the policy management server 12.

The job flow management server 11 checks whether or not the user who is executing the job flow possess authorization for the processing of the task vis-à-vis the document data, based on the security information that was obtained by querying the policy management server 12 (step S501). If the user who is executing the job flow does not have authorization, the job flow management server 11 determines the alternative task from the alternative task table (step S502). If the alternative task table that is queried has no alternative task, the process terminates with no executable task, i.e., treating the task as non-executable (steps S503 and S511). If, on the other hand, an alternative task is defined in the alternative task table, the job flow management server 11 sets the alternative task so defined to be the task to be executed (steps S503 and S504). If the user who is executing the job flow has authorization, the job flow management server 11 sets the task to be the task to be executed (steps S501 and S505).

The job flow management server 11 checks whether a user other than the user who is executing the job flow is involved with the task that is set in either step S504 or S505 as the task to be executed (step S506). If no related user is present, the process terminates, and the task that is set as the task to be executed is executed as written in FIG. 12, step S306.

If, on the other hand, a related user is present, the process in steps S507 through S510 is performed for each respective related user. The job flow management server 11 checks whether or not the related user has browsing authorization. The process continues as written if the related user has browsing authorization (step S508). If the related user does not have browsing authorization, however, the job flow management server 11 deletes the related user from the property of the task that is set as the task to be executed (steps S508 and S509). When the above process of steps S508 and S509 is finished for all related users, the property of the task determined from the property that is updated in step S509, and the process ends. When the task and the property are determined, the task so determined is executed, using the property so determined.

According to the third embodiment, the job flow is executed with an alternative task being substituted for a task for which the user who is executing the job flow, in addition to the effect according to the second embodiment, allowing the job flow to be executed flexibly and as appropriate to the security.

[Fourth Embodiment]

According to the third embodiment, a description was made of an example of dynamically changing the job flow to execute an alternative task. Following is a description according to a fourth embodiment of an example of a method of dynamically changing the job flow when the selected alternative task is duplicated within the job flow. The configuration for such as the task cooperation processing system according to the fourth embodiment is similar to that according to the first embodiment.

FIG. 19 depicts an example of a security level being set on a per user basis for a document B that is managed on the policy management server 12, according to the third embodiment. According to the security level setting 201, the administrator possesses browsing, copying, printing, and editing authorization for the document B. The user A possesses browsing and copying, though not printing or editing, authorization for the document B. The user B possesses browsing, though not copying, printing, or editing, authorization for the document B. The alternative task table, which holds the alternative tasks that may be executed when a task is not executable by reason of the security level of the document data is similar to the alternative task table according to the third embodiment, as depicted in FIG. 15. The information contained in the alternative task table is not limited to the example depicted in FIG. 15, however; alternative tasks may be set at will by the user.

Figure 20:
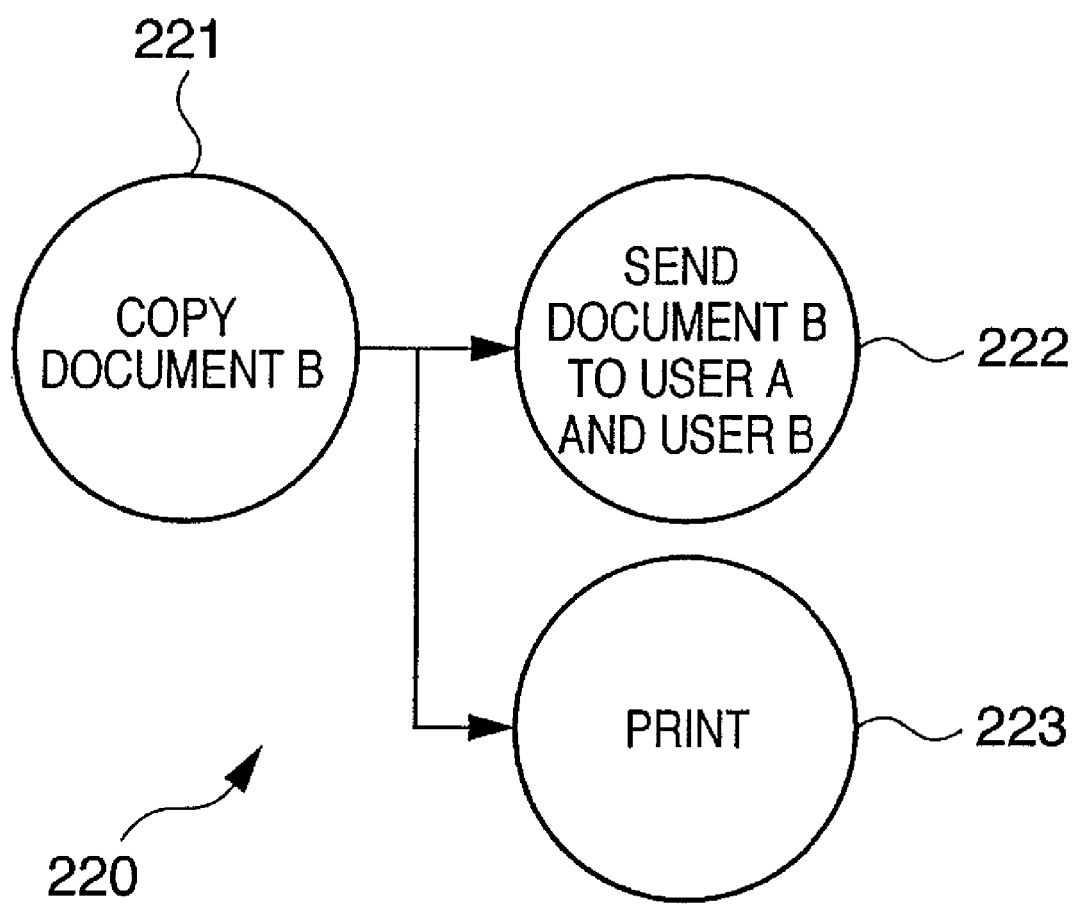
FIG. 20 depicts a description of a job flow definition that is depicted as an example according to a fourth embodiment.

FIG. 20 depicts a description of a job flow definition that is depicted as an example according to the fourth embodiment. A job flow 220 is configured of a task 221, which copies the document B, a task 222, which sends the document B to the user A and the user B, and a task 223, which prints the document B.

Figure 21:
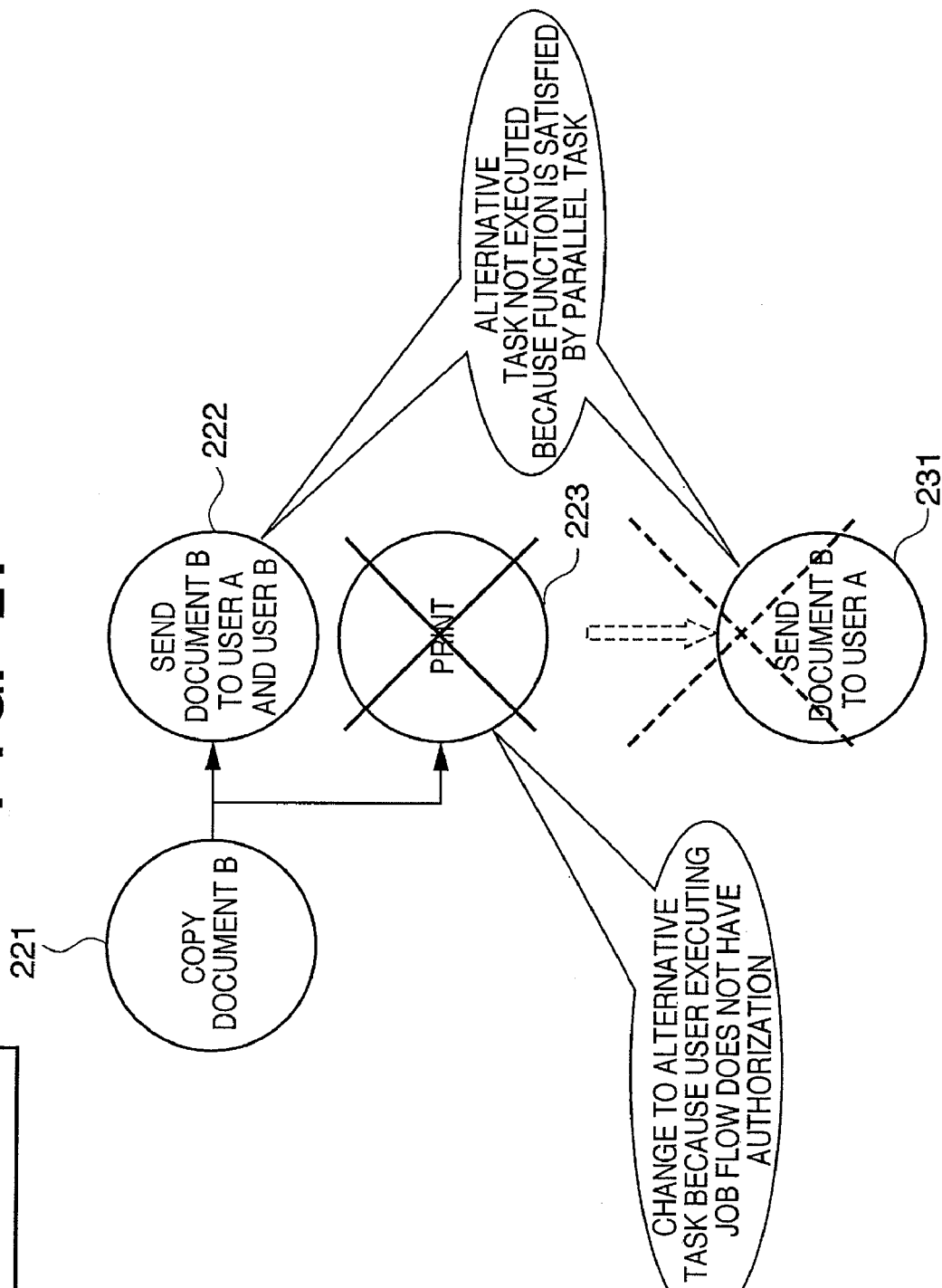
FIG. 21 depicts an execution status of each respective task when the user A executes a job flow 220 that is depicted in FIG. 20.

FIG. 21 depicts an execution status of each respective task when the user A executes the job flow 220 that is depicted in FIG. 20. The job flow management server 11 queries the user management server 13 for the user information of the user A (the user check in FIG. 2 (step 23)). If the user check is able to obtain user authentication, the job flow management server 11 processes the tasks within the job flow, in sequence, and in cooperation with the task processing apparatus 14.

The task 221 uses, i.e., copies, the document B that is managed on the policy management server 12, and thus, queries the policy management server for the security of the user A vis-à-vis the document B. Given that the user A has copying authorization for the document B, as depicted in FIG. 19, the task 221 is executed as written.

The task 222 sends the document B to the user A and the user B, meaning that the task 222 relates to the user B as well as the user A. Consequently, the policy management server 12 is queried for the security of the user B vis-a-vis the document B. Given that the user B has browsing authorization for the document B, as depicted in FIG. 19, the task 222 is executed as written. The task 223 relates only to the user A, who is executing the job flow, and thus, only the security of the user A vis-a-vis the document B is checked. It is apparent from the check that the user A does not have printing authorization vis-à-vis the document B. As described according to the third embodiment, the alternative task table that is depicted in FIG. 15 is searched for an alternative task to the non-executable printing task. According to the embodiment, the "send or e-mail the document B to the user who is executing the job flow" task is defined as the alternative task to the print, and the task 223 is changed to an alternative task 231, "send or e-mail the document B to the user who is executing the job flow", i.e., the user A. Sending the document B to the user A is, however, equivalent to the parallel task 222, preventing execution of the alternative task 231.

According to the fourth embodiment, execution of an alternative task is constrained so as to be prevented in a circumstance such as when a task will execute a process that is equivalent to a task that is set as the alternative task, either in parallel therewith or subsequent thereto, rather than simply executing the alternative task, according to the fourth embodiment. Doing so allows efficient execution of the job flow, by facilitating prevention of execution of an unnecessary task.

FIG. 22 is a flowchart describing a process of determining the alternative task and the property, according to the fourth embodiment. The process is executed by the job flow management server 11, in FIG. 12, step S304. The process is executed with regard to the task among the tasks within the job flow that is being executed that handles a document data that is managed on the policy management server 12.

The job flow management server 11 checks whether or not the user who is executing the job flow possess authorization for the process of the task vis-à-vis the document data, based on the security information that obtained via querying the policy management server 12 (step S601). If the user who is executing the job flow does not have authorization, the job flow management server 11 determines an alternative task from the alternative task table (step S602). If no alternative task is found in the examined alternative task table, the process terminates with no executable task (steps S603 and S612). If, on the other hand, an alternative task is defined in the alternative task table, the job flow management server 11 sets the alternative task so defined to the task to be executed (steps S603 and S604). If the user who is executing the job flow has authorization, the job flow management server 11 sets the task to the task to be executed (steps S601 and S606).

The job flow management server 11 checks whether or not a task is present that will perform an equivalent process to the alternative task, either in parallel therewith or subsequent thereto, when the alternative task is set in step S604 (step S605). If a task is present that will perform an equivalent process, the task is treated as a non-executable task (step S612), as there would be no point in executing the alternative task, and the process terminates. If no task is present within the job flow that will perform an equivalent process to the alternative task, the process in step 607 and thereafter is performed. Thus, a newly set alternative task is constrained not to duplicate another task, including an alternative task that is determined with regard to another task.

The job flow management server 11 checks whether or not a user other than the user who is executing the job flow is affiliated with the task that is set in either step S604 or step S606 as the task to be executed (step S607). If a related user is not present, the process ends, and the task that is set in FIG. 12, step S306 as the task to be executed is executed as written.

If, on the other hand, a related user is present, the process in steps S608 through S611 is performed for each respective related user. The job flow management server 11 checks whether or not the related user has browsing authorization (step S609). If the related user has browsing authorization, the process continues as written. If the related user does not have browsing authorization, the related user is deleted from the property of the task that is set as the task to be executed (steps S609 and S610). When the process in step S609 and step S610 is completed for all related users, the property of the task is determined according to the property that is updated in step S610, and the process ends. When the task and property are thus determined, the task so determined is executed, using the property so determined.

According to the fourth embodiment, when an alternative task is set, a duplicate process between the alternative task and another task that is already present within the job flow is detected, with the alternative task not used if a duplication exists, thus facilitating execution of superfluous tasks.

[Fifth Embodiment]

A description has been made wherein the job flow management server 11 and the task management apparatus (the print processing apparatus 14*a* and the application 14*b*) cooperate to execute the job flow, according to the first through the fourth embodiments. It would be permissible, however, to configure the job flow management server 11 and the task processing apparatus 14 as a single system.

Figure 23:
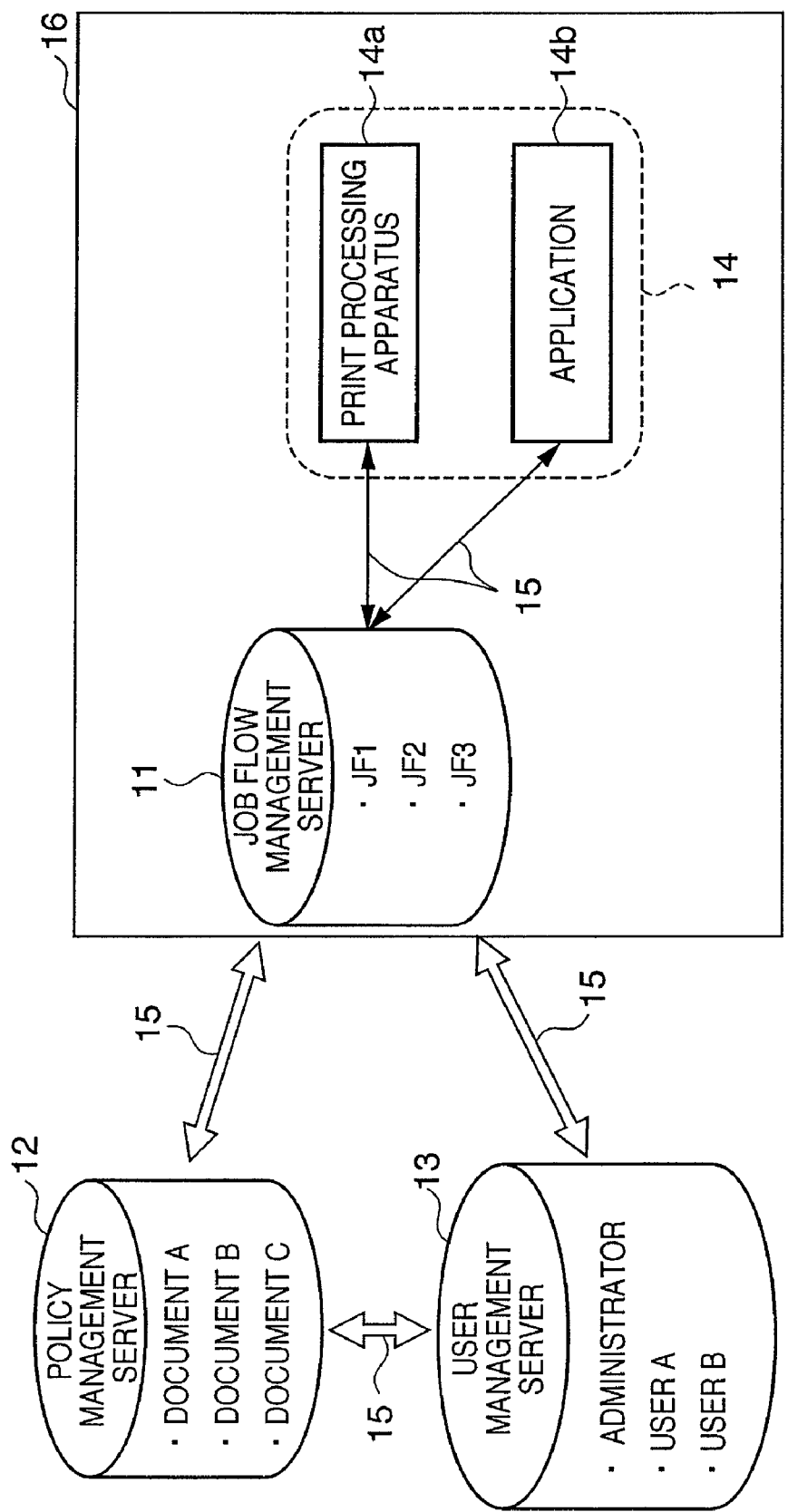
FIG. 23 depicts an overall configuration of a task cooperation processing system according to the fifth embodiment.

FIG. 23 depicts an overall configuration of a task cooperation processing system according to a fifth embodiment. As depicted in FIG. 23, a document processing apparatus 16 that is capable of executing the job flow is configured of an integration of the job flow management server 11 and the task processing apparatus 14 into a single device, according to the fifth embodiment. Such a document processing apparatus 16 is realized by employing a Multi Function Peripheral (MFP), according to the fifth embodiment.

That is, a MFP is configured so as to contain the job flow management server 11 and the task processing apparatus 14. The MFP is an apparatus that combines such functions as scanning, copying, printing, boxing (storing, of document data or source files), and sending of e-mail or data files, with the functions of the job flow management server 11, according to the first through the fourth embodiments. In the present circumstance, boxing refers to a storage area of the storage apparatus within the MFP, and the function of the sending of e-mail or data files is referred to as the send function. The MFP hosts a Java (registered trade mark) platform for running applications and programs, which is capable of cooperating with the MFP's native functions, i.e., scanning, copying, printing, boxing, and the sending of e-mail or data files. A representative example of an application and a program that is executable on the MFP that hosts the Java (registered trade mark) platform would include management of document data, conversion to PDF, and OCR processing. The job flow execution operation is the same as the job flow execution operation according to the first through the fourth embodiments, and thus, is omitted hereinafter.

It is permissible for the MFP that is configured in a single system of the job flow management server 11 and the task processing apparatus 14 to include the following arrangements. That is, it would be permissible for the MFP to include a document processing system that comprises a document management apparatus that executes a process task for a document according to plurality of job flows that define a process task execution sequence and a document property management apparatus that manages the property of the document.

In the present circumstance, the document management apparatus possesses a document input unit and a job flow process unit, which executes each respective process task that is contained within the job flow that is directed to be executed on the document that is inputted via the document input unit. The document management apparatus also possesses an output unit, that is connected to the job flow process unit, and which performs an output process on the document that is processed by the job flow process unit, according to the job flow that is directed to be executed. The document management apparatus also possesses a job flow management server, which controls the document management apparatus. The job flow management server possesses a document property acquisition unit, which obtains a property of the inputted document for the document property management apparatus. The job flow management server changes the process content of the process task that the job flow process unit executes, or the output content of the output unit, according to the property of the document that the document property acquisition unit obtains.

The document property that the document property management apparatus manages is a document policy property, and as such, is capable of including authorization to execute any of browsing, editing, printing, or copying of the document, at a minimum.

The document property management apparatus may also be a document property management server, which is connected to the document processing apparatus via a network.

The output process that the output unit performs may also be any of the printing, sending, or save file processes, at a minimum.

The job flow management server follows the execution authorization that is signified by the document policy property that the document property acquisition unit obtains. It is thus possible to dynamically change the process content of each respective process task, or the output content of the output unit, of the job flow that is directed to be executed.

The document input unit is also capable of either input via an image reading apparatus, or input via selection of a document from a storage region where the document is saved, at a minimum.

According to the first through the fifth embodiments, effects such as the following are brought about:
1. Ability to execute the job flow without concern for security, even if the job flow deals with data for which security has been set;
2. Ability to execute a meaningful job flow through the ability to control the execution of a non-executable task or a task that would be pointless to execute as a consequence of a security setting thereof; and
3. Ability to verify job flow execution results, even if the results change as a consequence of the security setting.

According to the embodiments, document data has been employed as the processing-target data for each respective task. It would be permissible, however, to use other data, such as image data. It would also be permissible to attach the security level that is entered into the policy management server 12 to the processing-target data, in the form of property information, for each respective instance of the processing-target data, and for the job flow management server 11 to query the property information. It would also be permissible to employ a configuration wherein the user who is executing the job flow such as the job flow depicted in FIG. 7 or FIG. 10, for example, is able to specify the processing-target data or the recipient user (the related user), for each respective task.

According to the present invention, execution of tasks is controlled, and job flow dynamically changed, in response to the property, such as the security, that relates to a constraint on the process, and is set for the data that is handled by the job flow. Hence, it is possible to carry out a job flow as appropriate to the property that is set for the data.

[Other Embodiments]

While the preferred embodiments have been described herein, it is possible for the present invention to take on other embodiments, including, for example, a system, an apparatus, a method, a program, or a storage medium. In concrete terms, it would be permissible to apply the present invention to a system that is configured of a plurality of devices, as well as an apparatus that is configured of a single device.

The present invention contains a circumstance wherein a software program is provided the system or the apparatus, either directly or remotely, and the functions according to the embodiment are configured by having a computer within the system or the apparatus read and execute the program so provided. In such a circumstance, the program so provided corresponds to the flowchart that is depicted in the figure according to the embodiment.

Accordingly, the program code that is installed into the computer in order to implement the function processing of the present invention will itself implement the present invention. The computer program for implementing the function processing of the present invention is itself included in the present invention as well.

In such a circumstance, it would be permissible for the program to take such a form as object code, a program that is executed by an interpreter, or script data that is supplied to an operating system, if the code possesses the function of the program.

Examples of storage media for providing the program include a floppy disk, a hard drive, an optical disc, a magneto-optical disk, an MO, a CD-ROM, a CD-R, a CD-RW, magnetic tape, a nonvolatile memory card, ROM, or a DVD, including DVD-ROM or DVD-R.

Another example of a method for providing the program would be using a web browser on a client computer to connect to a website on the Internet, and downloading the computer program of the present invention from the website to a hard drive or other storage medium. In such a circumstance, it would be permissible for the program so downloaded to be a compressed file that includes an automatic installation function. Implementation would also be possible by segmenting the program code that configures the program of the present invention into a plurality of files, and downloading the files from different webpages. A World Wide Web server that downloads the program files for implementing the function process of the present invention to a plurality of users is also included in the present invention.

Another form that may be used is distributing an encrypted form of the program of the present invention to users that is stored on a CD-ROM or other storage medium. In such a circumstance, a user who satisfies a prescribed condition may download a key information that decrypts the encryption from a website on the Internet, and use the key information to decrypt, execute, and install the program on the computer.

In addition to the computer implementing the function according to the embodiment by executing the loaded program, it would also be permissible for the function according to the embodiment to be implemented in collaboration with the operating system or other software running on the computer, in accordance with the instruction of the program. In such a circumstance, the function according to the embodiment is implemented by a process that is actually performed, in whole in or in part, by the operating system or other software.

It would also be permissible for the function according to the embodiment to be implemented, in whole in or in part, by writing the program that is read out from the storage medium to a memory that is either built into an expansion board that is installed into the computer, or into an expansion unit that is connected to the computer. In such a circumstance, a CPU or other device that is either built into the expansion board or the expansion unit performs the actual process, in whole in or in part, in accordance with the instruction of the program that is written to the expansion board or the expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-165364, filed Jun. 14, 2006, which is hereby incorporated by reference herein in its entirety.

What is claimed is:

1. A document processing system, comprising:
a document management apparatus adapted to execute a processing task according to a job flow that defines an execution order of a plurality of processing tasks; and
a document property management apparatus adapted to manage a property of a document,
wherein the document management apparatus comprises:
a document input unit;
a job flow processing unit adapted to execute each respective processing task that is included in the job flow, according to the job flow, on a document that is inputted via the document input unit;
an output unit connected to the job flow processing unit, and adapted to perform an output processing on the document that is processed by the job flow processing unit, according to the job flow;
a document property acquiring unit adapted to acquire a property of the document from the document property management apparatus when the document is inputted;
a check unit adapted to check, based on the property of the document acquired by said document property acquiring unit, what authorization to the document a first user executing the job flow has, and what authorization to the document a second user related to the job flow has, wherein the second user is different from the first user and is an output destination of the document; and
a change unit adapted to change either a processing content of the processing task that the job flow processing unit executes, or an output content of the output unit, according to a check result of the check unit,
wherein the job flow processing unit or the output unit operates according to the processing content or the output content, respectively, as changed by the change unit.

2. The document processing system according to claim 1, wherein the document property that the document property management apparatus manages is a document policy property, and includes an authorization to execute any of browsing, editing, printing, or copying on the document, at a minimum.

3. The document processing system according to claim 1, wherein the document property management apparatus is a document property management server that is connected over a network to the document management apparatus.

4. The document processing system according to claim 1, wherein the output processing that the output unit performs is any of printing, sending, or saving of a file, at a minimum.

5. The document processing system according to claim 1, wherein the change unit dynamically changes the processing content of each respective processing task of the job flow that is directed for execution, or an output content of the output unit, as per the authorization to execute that the document policy property that is acquired by the document property acquiring unit signifies.

6. The document processing system according to claim 1, wherein the input unit is either of an input from an image reading apparatus, or an input based on a selection of a document from a storage region wherein a document is saved, at a minimum.

7. A document processing method by a document processing system comprising: a document management apparatus adapted to execute a processing task according to a job flow that defines an execution order of a plurality of processing tasks; and a document property management apparatus adapted to manage a property of a document, said method comprising:
an input step of inputting the document into the document management apparatus;
a job flow processing step of executing each respective processing task that is included in the job flow that has been directed for execution, according to the job flow, on the document that is inputted via the input step, on the document management apparatus;

an output step of performing an output processing on the document that is processed by the job flow processing step, according to the job flow, on the document management apparatus;

a document property acquiring step of acquiring a property of the document from the document property management apparatus when the document is inputted, on the document management apparatus;

a check step of checking, based on the property of the document acquired at said document property acquiring step, what authorization to the document a first user executing the job flow has, and what authorization to the document a second user related to the job flow has, wherein the second user is different from the first user and is an output destination of the document; and a changing step of changing a processing content of the processing task that the job flow processing step executes, or an output content of the output step, according to a check result of the check step, wherein the job flow processing step or the output step operates according to the processing content or the output content, respectively, as changed in the change step.

8. The document processing method according to claim 7, wherein:

the document property that the document property management apparatus manages is a document policy property, and includes an authorization to execute any of browsing, editing, printing, or copying on the document, at a minimum.

9. The document processing method according to claim 7, wherein:

the document property acquisition step acquires a document property over a network, from the document property management apparatus.

10. The document processing method according to claim 7, wherein: the output processing that the output step performs is any of printing, sending, or saving of a file, at a minimum.

11. The document processing method according to claim 7, wherein: the change step dynamically changes the processing content of each respective processing task of the job flow that is directed for execution, or an output content of the output step, as per the authorization to execute that the document policy property that is acquired by the document property acquiring step signifies.

12. The document processing method according to claim 7, wherein, in the input step, at least one of an input from an image reading apparatus and an input based on a selection of a document from a storage region wherein a document is saved is performed.

13. A non-transitory computer-readable memory storing a control program that makes a computer function as a document processing apparatus adapted to execute a processing task on a document, according to a job flow that defines an execution order of a plurality of processing tasks, the program on the computer comprising:

an input step of inputting a document;

a job flow processing step of executing each respective processing task that is included in the job flow, according to the job flow, on a document that is inputted in the input step;

an output step of performing an output processing on the document that is processed by the job flow processing step, according to the job flow;

a document property acquiring step acquiring a property of the document from a document property management apparatus when the document is inputted;

a check step of checking, based on the property of the document acquired at said document property acquiring step, what authorization to the document a first user executing the job flow has, and what authorization to the document a second user related to the job flow has, wherein the second user is different from the first user and is an output destination of the document; and a changing step of changing a processing content of the processing task that the job flow processing step executes, or an output content of the output step, according to a check result of the check step, wherein the job flow processing step or the output step operates according to the processing content or the output content, respectively, as changed in the change step.

* * * * *